United States Patent
Li et al.

(10) Patent No.: US 12,299,341 B2
(45) Date of Patent: May 13, 2025

(54) METHODS, DEVICES, AND MEDIA FOR MANAGING A VIRTUAL WORKSPACE

(71) Applicants: Wei Li, Markham (CA); Che Yan, Toronto (CA); Da Yuan Huang, Markham (CA)

(72) Inventors: Wei Li, Markham (CA); Che Yan, Toronto (CA); Da Yuan Huang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/509,460

(22) Filed: Oct. 25, 2021

(65) Prior Publication Data
US 2023/0127644 A1   Apr. 27, 2023

(51) Int. Cl.
| | | |
|---|---|---|
| *G06F 3/14* | (2006.01) | |
| *G06F 3/04842* | (2022.01) | |
| *G06F 3/0485* | (2022.01) | |
| *G06F 3/0486* | (2013.01) | |

(52) U.S. Cl.
CPC ........ *G06F 3/1454* (2013.01); *G06F 3/04842* (2013.01); *G06F 3/0485* (2013.01); *G06F 3/0486* (2013.01)

(58) Field of Classification Search
CPC .................................................. G06F 3/1454
See application file for complete search history.

(56) References Cited

U.S. PATENT DOCUMENTS

| | | | | |
|---|---|---|---|---|
| 2004/0248617 A1* | 12/2004 | Oba | .................. | H04M 1/72412 |
| | | | | 455/557 |
| 2006/0294247 A1* | 12/2006 | Hinckley | ................ | G06F 3/038 |
| | | | | 709/228 |
| 2009/0106667 A1* | 4/2009 | Lyle | ........................ | G06F 3/147 |
| | | | | 715/750 |
| 2011/0249024 A1 | 10/2011 | Arrasvuori et al. | | |

(Continued)

FOREIGN PATENT DOCUMENTS

| | | |
|---|---|---|
| CN | 111475840 A | 7/2020 |
| WO | 2019229208 A1 | 12/2019 |

OTHER PUBLICATIONS

Panetta, Kasey, "Is the Cloud Secure", https://www.gartner.com/smarterwithgartner/is-the-cloud-secure, Oct. 10, 2019.

(Continued)

*Primary Examiner* — William Boddie
*Assistant Examiner* — Andrew B Schnirel

(57) ABSTRACT

Methods, devices, and processor-readable media for managing a virtual workspace shared by multiple devices are described. A unified GUI is presented to each device in which the other devices sharing the virtual workspace are represented by GUI elements, with the location of the other local devices present within the same local environment corresponding to a display location of the corresponding GUI element around the perimeter of the GUI screen. The locations of the other local devices are determined based on sensor data from the local devices, such as NFC radio data or other short-range sensor data, without the need for a dedicated, specially positioned camera or other sensor configured to track the devices within the local environment.

20 Claims, 15 Drawing Sheets

(56) References Cited

U.S. PATENT DOCUMENTS

| | | | | |
|---|---|---|---|---|
| 2011/0294433 | A1* | 12/2011 | Matsubara | H04M 1/72412 |
| | | | | 455/41.3 |
| 2013/0331130 | A1* | 12/2013 | Lee | A61K 31/196 |
| | | | | 455/457 |
| 2015/0082196 | A1 | 3/2015 | Berger et al. | |
| 2021/0004197 | A1 | 1/2021 | Santhakumar et al. | |
| 2022/0391158 | A1* | 12/2022 | Lemmens | G06F 3/1438 |

OTHER PUBLICATIONS

Marquardt, Nicolai et al., "Cross-Device Interaction via Micro-mobility and F-formations", UIST '12: Proceedings of the 25th annual ACM symposium on User interface software and technology, Oct. 2012 pp. 13-22. DOI: https://doi.org/10.1145/2380116.238012.

Radle, Roman et al., "HuddleLamp: Spatially-Aware Mobile Displays for Ad-hoc Around-the-Table Collaboration", ITS 14: Proceedings of the Ninth ACM International Conference on Interactive Tabletops and Surfaces, Nov. 2014, p. 45-54. DOI: https://doi.org/10.1145/2669485.2669500.

Radle, Roman et al., "Spatially-aware or Spatially-agnostic?: Elicitation and Evaluation of User-Defined Cross-Device Interactions", CHI '15: Proceedings of the 33rd Annual ACM Conference on Human Factors in Computing Systems, pp. 3913-3922,. DOI: https://doi.org/10.1145/2702123.2702287.

Tahir Mahmood et al, Building Multiple Coordinated Spaces for EffectiveImmersive Analytics through Distributed Cognition, 2018 International Symposium on Big Data Visual and Immersive Analytics (BDVA), 11 pages. 2018.

\* cited by examiner

METHODS, DEVICES, AND MEDIA FOR MANAGING A VIRTUAL WORKSPACE

RELATED APPLICATION DATA

This is the first patent application related to this matter.

FIELD

The present application generally relates to multi-user virtual environments for collaborative work, and in particular to methods, devices, and media for managing a virtual workspace shared by multiple devices.

BACKGROUND

As work is increasingly performed on computers and other electronic devices, there is an increasing need for tools to facilitate collaboration by multiple users working on multiple devices. Several such tools have been developed, and these existing approaches to multi-user or multi-device collaboration generally fall into three categories.

Cloud-based virtual devices and virtual storage represent a first existing approach. Tools such as Google Drive™, Microsoft OneDrive™, DropBox™, and Apple iCloud™ all provide cloud-based storage that can be accessed by multiple users, and may enable users to reconcile (i.e. "sync") a set of shared data (such as files) across multiple devices. However, this approach is limited by the ability of multiple users to interact in real time; instead, file uploads and downloads to and from cloud servers act as a bottleneck for collaboration. Due to the need to upload and download each update to each file stored in the cloud, users' internet speeds also limit the ability of a user to work with the shared data. In addition, the access control and security features of these tools are often rudimentary; according to Gartner (Kasey Panetta, "Is the Cloud Secure?", Gartner, Oct. 19, 2019, https://www.gartner.com/smarterwithgartner/is-the-cloud-secure/), 90% of organizations that fail to control public cloud use will share information inadvertently or inappropriately through 2025.

A second existing approach to multi-device collaboration is typified by cloud-based collaboration platforms such as Google Docs™, Miro™, Zoom™, and aggie.io™. These platforms allow users to contribute anytime, anywhere, from any type of user device or software platform (e.g. mobile phones, different desktop computer operating systems, etc.), making it easy to invite a larger number of people into a collaborative project. Google Docs™ enables multi-user editing of the same file; Miro™ is an online collaborative whiteboard for ideation and brainstorming; Zoom™, enables screen sharing and file sharing during online meetings; and aggie.io™ allows users to draw a picture together in real time over the Internet using a web browser-based interface. However, this approach also exhibits several limitations. First, content sharing using these platforms is usually complicated: when conducting a common collaborative task like screen sharing, users are required to perform three steps (stop sharing, giving control to another user, start sharing the new user's screen). Similarly, sharing a file with an individual or a group typically requires at least four steps (open a chat window, select a user or group from a dropdown menu, select a file using a file browser interface, confirm the file sharing action). A second limitation is the difficulty of file sharing and window management while operating a collaborative session: during cloud-based collaboration, if a user doesn't have a second monitor, the user's local desktop is usually fully occupied or occluded by the collaborative platform interface, complicating the performance of tasks that require interaction with the user's local desktop, such as taking notes while viewing another user's presentation or finding local files during an online meeting, such that the user has to frequently switch between the user's local workspace and the collaboration workspace. This adds additional time and imposes cognitive load on the user while interacting with the content of the collaboration platform. A third limitation is that remote communication often results in less engagement: compared to in-person contact, online collaboration results in lower-quality communication and slows down the decision-making process, due to the lack of context present in in-person interactions, such as facial expressions and body gestures.

A third existing approach to multi-user collaboration is represented by peer-to-peer (P2P) file-sharing applications, including in-person or near-range file-sharing technologies like Apple AirDrop™ and Android Beam™, as well as network-based P2P file-sharing software like Takeafile.com. In-person P2P file sharing typically uses short-range radio technologies like NFC (near field communications) to directly and wirelessly transmit digital data from one device to another. Network-based P2P file sharing typically uses P2P network protocols like WebRTC to transfer files from one network-connected device to another without using an intermediate server to store the file. While P2P file sharing can provide a fast and secure technique for data transfer, this approach isn't suitable for real-time collaborative work like real-time collaborative editing of documents or any real-time co-creation of content.

In addition to the three existing approaches to multi-user collaboration described above, researchers have proposed various approaches to in-person multi-device collaboration for real-time co-creation across multiple devices during an in-person meeting. Such proposals include systems like Micro-mobility and F-formations, described in "Cross-device interaction via micro-mobility and f-formations", UIST '12: Proceedings of the 25th annual ACM symposium on User interface software and technology, October 2012 Pages 13-22. DOI: https://doi.org/10.1145/2380116.2380121, and HuddleLamp, described in "HuddleLamp: Spatially-Aware Mobile Displays for Ad-hoc Around-the-Table Collaboration", ITS '14: Proceedings of the Ninth ACM International Conference on Interactive Tabletops and Surfaces, April 2015, Page 45-54. DOI: https://doi.org/10.1145/2669485.2669500.

These proposed approaches are intended to enable collaborative features such as file sharing and screen sharing across multiple devices present within a shared physical space. However, each of these proposed approaches is dependent upon the shared physical space being equipped with various sensors, such as overhead RGB cameras, Microsoft Kinect sensors, and/or radio transceivers specifically positioned and configured to track the devices involved in the collaboration session.

There thus exists a need for techniques to enable multi-user and multi-device real-time collaboration that overcome one or more of the disadvantages of existing and proposed approaches identified above.

SUMMARY

The present disclosure describes methods, devices, and media for managing a virtual workspace shared by multiple devices. In some embodiments, a unified graphical user interface (GUI) is presented to each device in which the other devices sharing the virtual workspace are represented by GUI elements, with the location of the other local devices present within the same local environment corresponding to a display location of the corresponding GUI element around the perimeter of the GUI screen. The locations of the other local devices are determined based on sensor data from the local devices, such as near-field communication (NFC) radio data or other short-range sensor data, without the need for a dedicated, specially positioned camera or other sensor configured to track the devices within the local environment.

The use of GUI elements arranged around a perimeter of a GUI screen to indicate and enable interaction with other local devices may increase the intuitiveness and efficiency of human computer interaction (HCI) involving multi-device collaboration, as suggested by the study "Spatially-aware or Spatially-agnostic?: Elicitation and Evaluation of User-Defined Cross-Device Interactions", CHI '15: Proceedings of the 33rd Annual ACM Conference on Human Factors in Computing Systems, Pages 3913-3922, DOI: https://doi.org/10.1145/2702123.2702287. The study compares the efficiency and comfort of users performing three different common collaboration tasks—duplicating a view, coping text, and moving an object—using three different GUI configurations. The GUI configurations were: selecting a device from a popup menu listing devices; selecting a device from a miniature spatial representation of the devices' positions shown in a corner of the screen; and selecting a device shown as a GUI element displayed at a position around the perimeter of the screen corresponding to its real-world position. The results of the study show that the third GUI configuration is the most efficient and comfortable for users.

Thus, examples described herein may afford greater comfort and efficiency to users interacting with a multi-device shared virtual workspace than other GUI configurations. Common interactions with the other devices, such as sharing a file with another device or granting screen sharing control to another device, may thus be accomplished by simple and intuitive interaction with the GUI elements corresponding to the other devices. By eliminating the need for an overhead camera or other fixed sensor installed within the environment to track the position of the various local devices, examples described herein may enable this form of comfortable, efficient interaction in any space, not just a space specially prepared and configured for such interactions.

Various embodiments also include other features. The multiple devices may include both local devices present within the same local environment, and remote devices communicating with each other via a network communication session; when a new local or remote device begins sharing the virtual workspace, it is joined to the network communication session. The virtual workspace may be shared with a new device in response to detecting the device within the local environment, followed by manual or automatic authorization from an existing device sharing the virtual workspace. Other features are also disclosed, such as user interactions for switching between a local workspace and the shared workspace and between a radar view providing details of the other devices within a screen border and a portal view maximizing the amount of screen real estate for display of the workspace.

As used herein, statements that a second item (e.g., a value, calculation, or determination) is "based on" a first item may mean that characteristics of the second item are affected or determined at least in part by characteristics of the first item. The first item may be considered an input to an operation or calculation, or a series of operations or calculations, that produces the second item as an output that is not independent from the first item.

In some aspects, the present disclosure describes a method for managing a virtual workspace shared among a plurality of devices comprising a user device and one or more local devices such that each of the plurality of devices has access to shared workspace information associated with the virtual workspace. The method comprises determining, for each local device, a direction of the local device relative to the user device, based on location information that is obtained based on sensor data collected by one or more of the plurality of devices. A graphical user interface (GUI) screen is and displayed on a display of the user device. The GUI screen includes, for each local device, a linked device GUI element corresponding to the local device and comprising a graphical indicator of the respective direction of the local device.

In some aspects, the present disclosure describes a user device for managing a virtual workspace shared among a plurality of devices comprising the user device and one or more local devices such that each of the plurality of devices has access to shared workspace information associated with the virtual workspace. The user device comprises a processor device, a display, and a memory storing machine-executable instructions which, when executed by the processor device, cause the user device to process location information based on sensor data collected by one or more of the plurality of devices to determine, for each local device, a direction of the local device relative to the user device, and display, on the display, a graphical user interface (GUI) screen including, for each local device, a linked device GUI element corresponding to the local device and comprising a graphical indicator of the respective direction of the local device.

In some aspects, the present disclosure describes a non-transitory processor-readable medium having machine-executable instructions stored thereon which, when executed by a processor of a user device, cause the user device to manage a virtual workspace shared among a plurality of devices comprising the user device and one or more local devices such that each of the plurality of devices has access to shared workspace information associated with the virtual workspace. Location information based on sensor data collected by one or more of the plurality of devices is processed to determine, for each local device, a direction of the local device relative to the user device. A graphical user interface (GUI) screen is displayed on a display of the user device, including, for each local device, a linked device GUI element corresponding to the local device and comprising a graphical indicator of the respective direction of the local device.

In some examples, the method further comprises obtaining remote device information identifying one or more remote devices. The virtual workspace is further shared among the one or more remote devices. The GUI screen further includes, for each remote device of the one or more remote devices, a linked device GUI element corresponding to the remote device and comprising a graphical indicator of the remote device.

In some examples, each linked device GUI element comprises an interactive GUI element configured to receive user input via a pointing device of the user device.

In some examples, each linked device GUI element corresponding to a local device graphically indicates the direction of the local device by being displayed within the GUI screen at a respective position along a perimeter of the GUI screen indicative of the direction of the respective local device.

In some examples, the method further comprises, prior to displaying the GUI screen, a number of steps. A request for a requesting device to join the virtual workspace is received at the user device. Request acceptance information indicating permission for the requesting device to join the virtual workspace is obtained. In response to obtaining the request acceptance information, the virtual workspace is shared with the requesting device such that the requesting device is included among the one or more local devices or the one or more remote devices.

In some examples, obtaining the request acceptance information comprises a number of steps. A request GUI element representative of the request is displayed on the display of the user device. A request acceptance user input indicating acceptance of the request is received via an input device of the user device. The request acceptance user input is processed to generate the request acceptance information.

In some examples, obtaining the request acceptance information comprises receiving, from the requesting device, user account information indicating a common user account shared by the requesting device and one or more of the following: the user device, one of the one or more local devices, and one of the one or more remote devices.

In some examples, the requesting device is a local device of the one or more local devices, and the request is received in response to the requesting device being determined, based on the sensor data, to be within a local environment of the user device.

By automatically sharing the virtual workspace with a new device brought into proximity to the other local devices within the local environment, example embodiments may provide advantages over the multi-step process typical of joining a new device to a local or remote collaboration session: connecting to WiFi, launching a collaboration software application on the new device being joined, and logging the user of the new device in to the collaboration session using a session identifier.

In some examples, the one or more remote devices are configured to communicate with each other via a network communication session, and sharing the virtual workspace among the one or more remote devices and the plurality of devices further comprises configuring the plurality of devices to communicate with each other and the one or more remote devices via the network communication session.

In some examples, the GUI screen comprises a virtual workspace GUI screen further including at least a portion of the shared workspace information.

In some examples, the method further comprises a number of steps. A workspace switching user input is received via an input device of the user device. A local workspace GUI screen is displayed on the display of the user device. The local workspace GUI screen also includes a linked device GUI element for each of the one or more local devices and each of the one or more remote devices. The local workspace GUI screen includes local workspace information not associated with the virtual workspace.

By providing a simple, intuitive gesture-based technique for switching between a local desktop and a shared desktop while presenting the user with a non-intrusive GUI, some example embodiments described herein may provide advantages over existing approaches. The hybrid nature of the unified GUI, uniting content from the local workspace and the shared workspace within the same visual framework, means that various operations that need to be performed on the local desktop or the shared desktop can be easily accessed by a user with a single gesture.

In some examples, the method further comprises receiving, via the pointing device, a dragging user input indicating a dragging gesture performed with respect to a data object icon corresponding to a local data object not associated with the virtual workspace. The dragging gesture terminates at a location within the GUI screen corresponding to a first linked device GUI element of the linked device GUI elements. The first linked device GUI element corresponds to a first device of the one or more local devices or the one or more remote devices. In response to receiving the dragging user input, the local data object is sent to a first device.

In some examples, the method further comprises receiving, at the first device, the local data object of the user device. A first device GUI screen is displayed on a display of the first device. The first device GUI screen includes a received data object icon. A first device dragging user input is received via a pointing device of the first device, indicating a dragging gesture performed with respect to the received data object icon. In response to receiving the first device dragging user input, a first device local workspace GUI screen including first device local workspace information not associated with the virtual workspace is displayed on the display of the first device. The received local data object is saved to a memory of the first device in association with the first device local workspace information.

In some examples, the method further comprises receiving, via the pointing device, a dragging user input indicating a perimeter dragging gesture performed with respect to a data object icon corresponding to a local data object not associated with the virtual workspace. The perimeter dragging gesture terminates at a location within the GUI screen within a predetermined distance of an edge of the GUI screen. In response to receiving the perimeter dragging user input, the local data object is sent to the one or more local devices and the one or more remote devices.

By providing intuitive and efficient techniques for sharing a file or other data object with one or multiple devices sharing the virtual workspace, example embodiments may provide advantages over existing approaches. A single gesture may be used to share the file with all connected devices at the same time. Furthermore, by visually presenting spatial relationships for each linked local device, example embodiments described herein may provide ambient information to the user as part of a highly usable and navigable interface.

In some examples, the method further comprises activating a shared screen mode of the user device such that a local workspace GUI screen of the user device, including local workspace information of the user device not associated with the virtual workspace, is accessible by the one or more local devices and the one or more remote devices as part of the shared workspace information. A screen share transfer user input indicating a selection of one of the linked device GUI elements associated with a first device of the one or more local devices or the one or more remote devices is received via an input device of the user device. In response to receiving the screen share transfer user input, a first device workspace GUI screen including local workspace information of the first device is displayed on the display of the user device.

In some examples, the input device comprises the pointing device, the GUI screen comprises a virtual workspace GUI screen further including at least a portion of the shared workspace information, and the screen share transfer user input comprises a dragging gesture beginning at a location, within the GUI screen, of a first linked device GUI element of the plurality of linked device GUI elements, and ending at a location, within the GUI screen, displaying the portion of the shared workspace information.

By providing intuitive and efficient techniques for transferring screen sharing control between devices sharing the virtual workspace, example embodiments may provide advantages over existing approaches. Cloud collaborations platform like Zoom™ can exhibit low efficiency when conducting the screen sharing task, which requires at least three steps: the first device stops sharing its screen, the first device's user gives control to another user, and the other user starts sharing the screen of his or her device. In example embodiments described herein, a single gesture by the user currently sharing his or her device's screen (or by a user managing the collaboration session) can be used to stop sharing the screen of one device and start sharing the screen of another device.

In some examples, the GUI screen is a portal screen displayed on the display of the user device when the user device is operating in a portal mode. The portal screen includes, in addition to the linked device GUI elements displayed at respective positions along the perimeter of the portal screen, a workspace panel having a first display size. The display of the user device displays a radar screen when the user device is operating in a radar mode. The radar screen includes a radar screen workspace panel having a second display size smaller than the first display size, such that a border is displayed by the display outside of the radar screen workspace display panel, and for each linked device GUI element of the portal screen, a corresponding radar screen linked device GUI element displayed at a respective position along the perimeter of the display within the border. The method further comprises receiving, via an input device of the user device, a display mode switching user input, and in response to receiving the display mode switching user input, switching the user device between the portal mode and the radar mode.

In some examples, the input device comprises a touchscreen. The display mode switching user input comprises, to switch from portal mode to radar mode, an inward pinching gesture, and to switch from radar mode to portal mode, an outward pinching gesture.

The described embodiments may provide a fast and intuitive way for switching between the portal mode and the radar mode, wherein the portal screen maximizes the display region for shared virtual workspace information and the radar screen shows a detailed view of the connected devices for active device management.

In some aspects, the present disclosure describes a non-transitory processor-readable medium having instructions tangibly stored thereon. The instructions, when executed by a processor device, cause the processor device to perform the method steps described above.

Thus the examples disclosed herein may provide various advantages. First, the unified GUI may increase group productivity during a collaborative session by providing intuitive and simple interactions for common collaborative tasks such as screen sharing and file sharing. Second, some examples may simplify the interactions necessary for a new device to be joined to the collaborative session, including establishing communications with both local and remote devices. Third, some examples may provide a single efficient, safe, stable, and flexible platform for collaboration among multiple users and for performing tasks across multiple devices controlled by a single user. Fourth, some examples may provide a platform for seamlessly bridging in-person and remote collaboration.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes methods, devices, and media for managing a virtual workspace shared by multiple devices. Example embodiments will be described with reference to a user device displaying a graphical user interface (GUI) for managing the virtual workspace. However, it will be appreciated that some or all of the other devices sharing the virtual workspace may be configured with the same GUI for performing the same operations described herein with reference to the user device. Thus, the described user device is provided as an example of the operations of a device sharing the virtual workspace.

Figure 1:
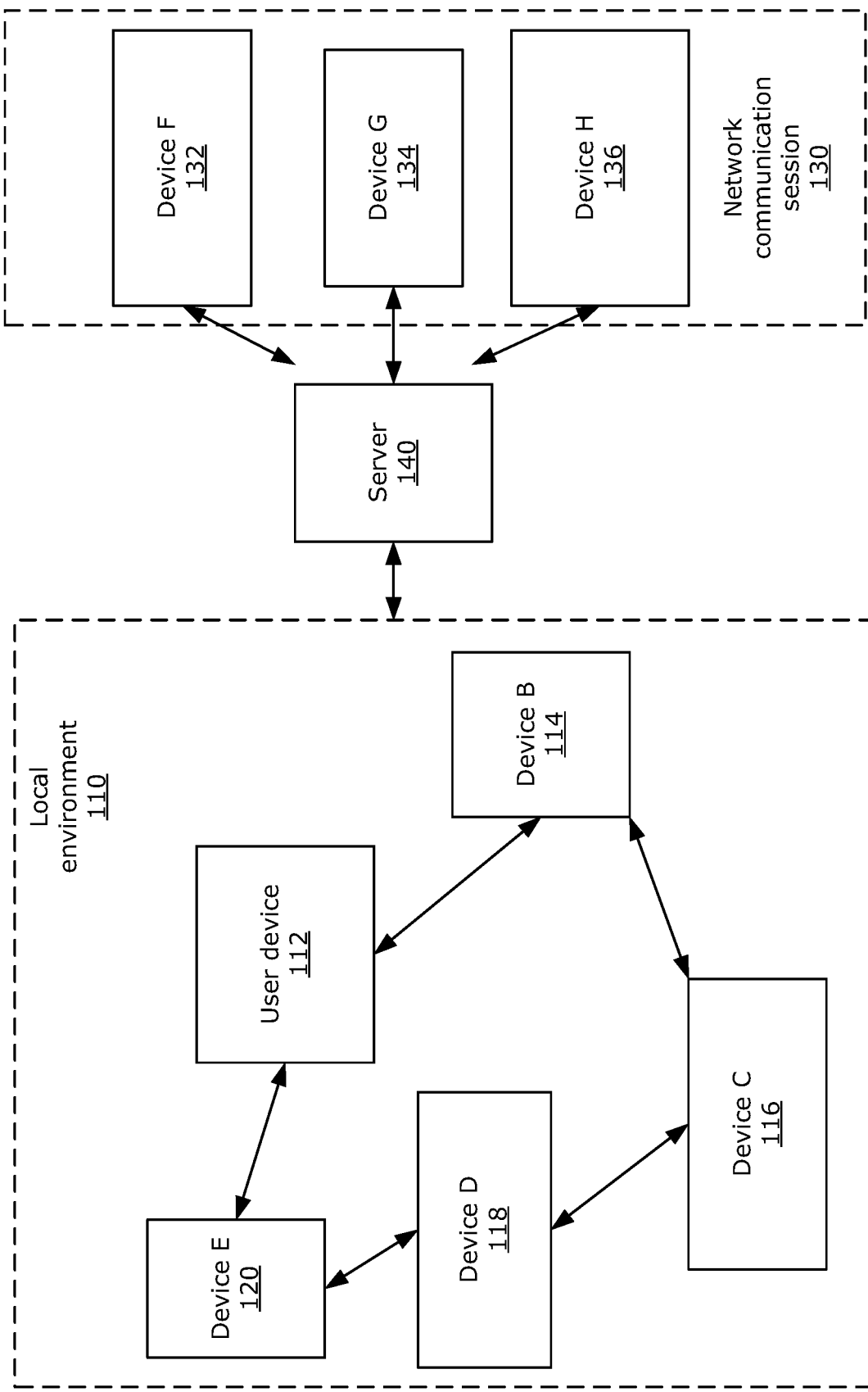
FIG. 1 is a block diagram illustrating local devices in a local environment and remote devices in a network communication session sharing a virtual workspace according to examples described herein.

FIG. 1 shows a user device 112 (such as a laptop or desktop computer, a tablet, or a smart phone) present in a local environment 110 (such as a room in which an in-person meeting is taking place) with one or more other local devices (shown as device B 114, device C 116, device D 118, and device E 120), as well as one or more remote devices (shown as device F 132, device G 134, and device H 136) in a network communication session 130. The remote devices 132, 134, 136 need not be present in the local environment 110 in example embodiments described herein. In the illustrated example, the network communication session 130 is mediated by a server 140, such as a cloud server; however, it will be appreciated that in some embodiments the network communication session 130 may be implemented using peer-to-peer (P2P) communications over a network.

In example embodiments described herein, the user device 112, local devices 114, 116, 118, 120, and remote devices 132, 134, 136 are configured to share a virtual workspace enabling collaboration among users of the devices 112, 114, 116, 118, 120, 132, 134, 136, including common collaborative tasks such as file sharing and screen sharing, as further described below.

In some embodiments, devices present within a "local environment" are those devices in relative physical proximity to each other within a shared physical space such as a room, such relative proximity being defined by the short-range communication capabilities of the devices; all devices not present within the local environment are deemed to be "remote" from the devices in the local environment. In some embodiments, a device's status as "remote" or "local" is determined based on how it interacts with the other device sharing the virtual workspace: thus, a device may be considered "remote", even if it present within the local environment, if it only interacts with the other devices via the network communication session 130 (this may be true, for example, of devices that lack the capabilities required to communicate with the local devices using a short-range communication means). In some examples, a single device may be treated as both a remote device and a local device.

Figure 2:
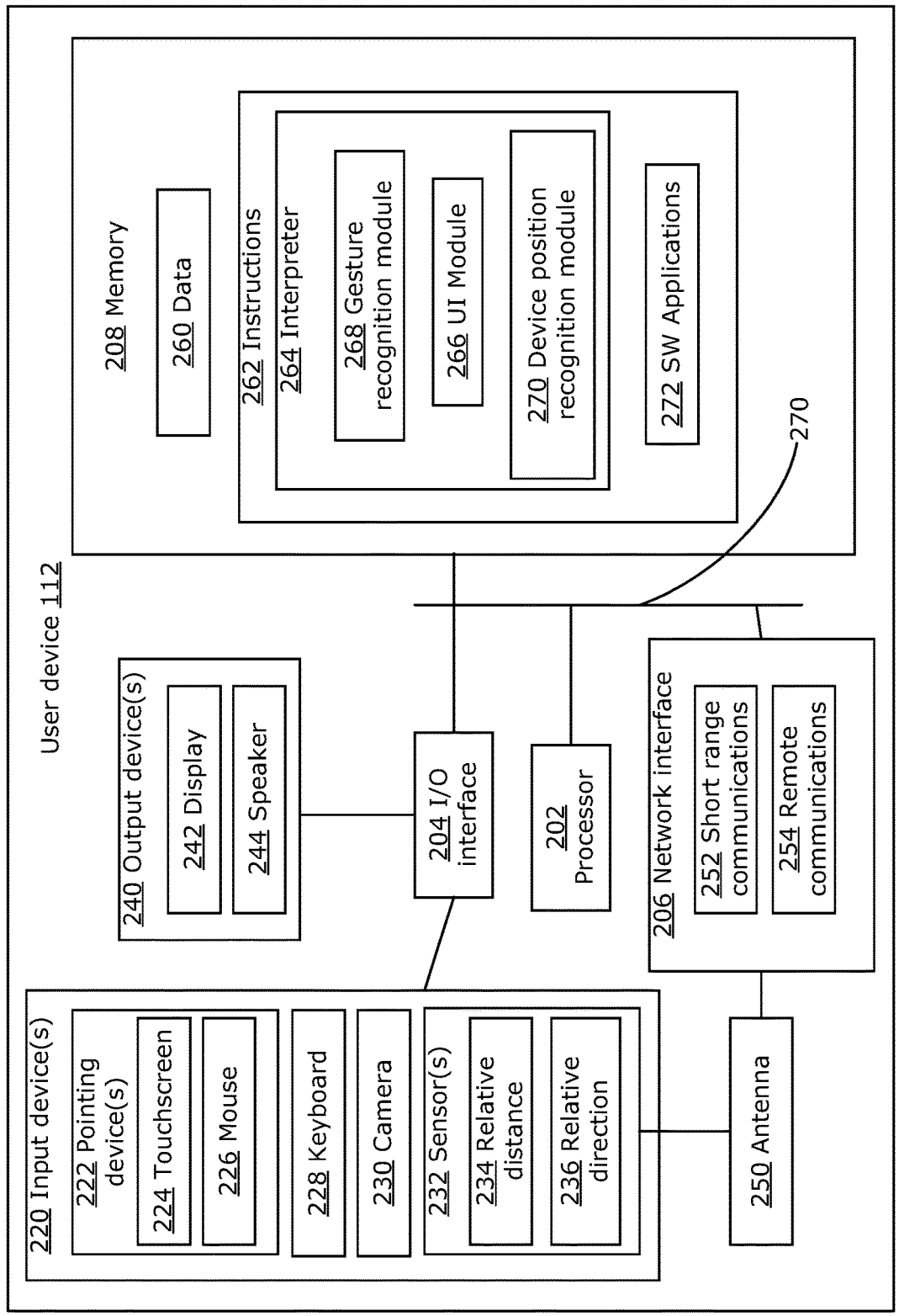
FIG. 2 is a block diagram illustrating some components of the example user device of FIG. 1.

FIG. 2 shows a block diagram of the user device 112. Although an example embodiment of the user device 112 is shown and discussed below, other embodiments may be used to implement examples disclosed herein, which may include components different from those shown. Although FIG. 2 shows a single instance of each component of the user device 112, there may be multiple instances of each component shown.

The user device 112 includes one or more processors 202, such as a central processing unit, a microprocessor, an application-specific integrated circuit (ASIC), a field-programmable gate array (FPGA), a dedicated logic circuitry, or combinations thereof. The one or more processors 202 may collectively be referred to as a "processor device".

The user device 112 also includes one or more input/output (I/O) interfaces 204 which interface with input devices 220 and output devices 240. Input devices 220 may include pointing devices 222 such as a touchscreen 224 or mouse 226, sensors 232 such as distance sensors 234 and relative direction sensors 236, keyboards 228, cameras 230, and any other input means. Output devices 240 may include displays 242, speakers 244, and other output means. In some embodiments, a camera 230 or other sensor 232 may be used to sense user gestures or other visible or haptic user inputs and may thereby act as a pointing device 222. Any references to pointing devices 222 or touchscreens 224 herein may therefore also apply to camera-based or sensor-based gesture-recognition user input techniques.

In some embodiments, the sensors 232 may include one or more sensors using antennas 250 that may also be used by the network interface 206 described below. The antennas 250 may be used in various embodiments for radio-based sensing and communication techniques such as UWB (ultra-wideband), Bluetooth™, WiFi (IEEE 802.11), or NFC (near-field communication). The sensors 232 used in various embodiments may include light sensors (e.g., visible or invisible light cameras 230), acoustic sensors and/or acoustic signal generators (e.g., using the speakers 244 and a microphone), electromagnetic signal transmitters and/or detectors (e.g. Hall effect sensors, or the various radio-based sensing techniques described above), physical contact sensors (e.g. inertial measurement units and/or force sensors), or any other sensor types suitable to act as a relative distance sensor 234 and/or a relative direction sensor 236 for detecting the locations of other electronic devices in a local environment 110. It will be appreciated that any suitable sensing technique using one or more of the sensors 232 described above may be used by example user devices described herein to sense the relative distances and relative directions of the other local devices within the local environment 110.

The user device 112 may include one or more network interfaces 206 for wired or wireless communication with a network (e.g., an intranet, the Internet, a P2P network, a WAN and/or a LAN) or the other devices in the local environment 110 and/or the network communication session 130. The network interface(s) 206 may include wired links (e.g., Ethernet cable) and/or wireless links (e.g., one or more antennas 250) for intra-network and/or inter-network communications.

The user device 112 includes one or more memories (collectively the memory 208), which may include a volatile or non-volatile memory (e.g., a flash memory, a random access memory (RAM), and/or a read-only memory (ROM)). The non-transitory memory 208 may store data 260, as well as instructions 262 for execution by the processor device 202, such as to carry out examples described in the present disclosure. The memory 208 may include other software instructions 262, such as for implementing an operating system and other software applications 272 or functions.

The data 260 may include the various types of data described with reference to example embodiments herein, such as shared workspace information 504, local workspace information 806, sensor data collected by the sensors 232, local data objects (e.g. files), etc. The instructions 262 may include instructions for implementing an interpreter 264 for managing the virtual workspace shared among the user device and the local and remote devices. The interpreter 264 operates by obtaining sensor data from the sensors 232 of the user device 112 and/or location information based on sensor data from the sensors of one or more of the other local devices in the local environment 110 and using a device position recognition module 270 to process the sensor data and/or location information, thereby recognizing relative positions of the user device 112 and the other local devices 114, 116, 118, 120. In some embodiments, the interpreter 264 may also obtain information relating to the network communication session 130. The interpreter 264 then uses a user interface (UI) module 266 to generate and manage a unified GUI shared by the various devices 112, 114, 116, 118, 120, and optionally 132, 134, 136, enabling access to a shared virtual workspace. Users of the various devices 112,

114, 116, 118, 120, 132, 134, 136 may interact with and affect the virtual workspace using a user input module, shown in FIG. 2 as a gesture recognition module 268 for recognizing gesture-based controls performed by users (e.g., using a touchscreen 224 or a camera 230 to detect the gestures).

In some examples, the user device 112 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the user device 112) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the user device 112 may communicate with each other via a bus 270, for example.

Figure 3:
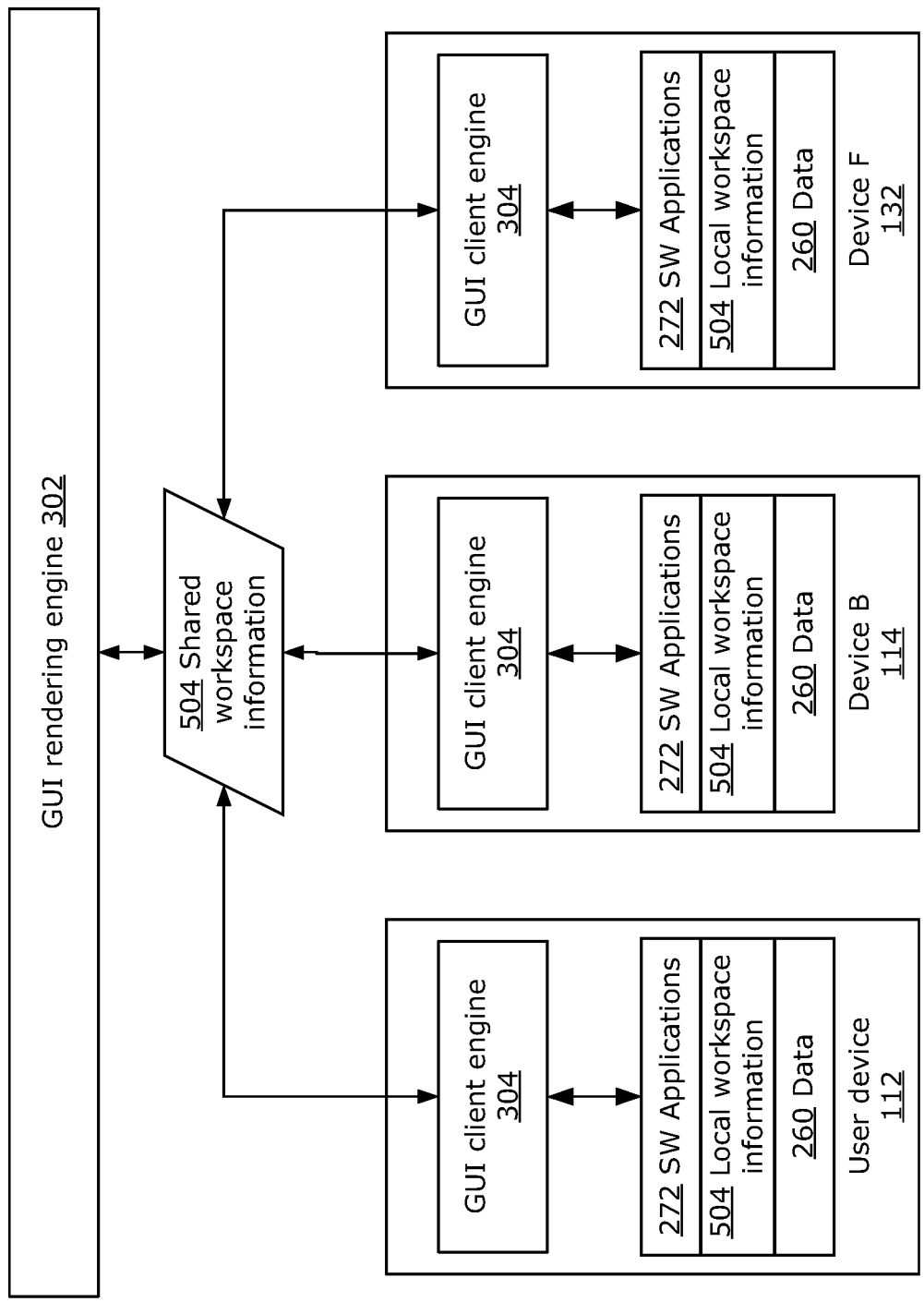
FIG. 3 is a block diagram illustrating data flows of an example unified UI for a virtual workspace shared by the local and remote devices of FIG. 1.

FIG. 3 shows data flows of an example unified UI for a virtual workspace shared by the local and remote devices 112, 114, 116, 118, 120, 132, 134, 136. A GUI rendering engine 302, which may be implemented on one, some, or all of the devices 112, 114, 116, 118, 120, 132, 134, 136, or on the server 140, communicates with GUI client engines 304 of each device to generate shared workspace information 504 which may be accessed by each device sharing the virtual workspace. The shared workspace information 504 may include any information suitable for sharing with users of a collaborative workspace, such as a shared desktop view showing icons corresponding to files or software applications, a file browser view, video feeds showing camera inputs from other devices sharing the virtual workspace, the content of a document or data object being edited collaboratively, and so on.

Each device implements a GUI client engine 304 with access to the device's local software applications 272, local workspace information 806 (e.g. a local desktop view), and the data 260 of the respective device. As the device (e.g. user device 112) interacts with the shared virtual workspace and/or the other devices sharing the virtual workspace, information from each of these sources 272, 806, 260 may be shared with the virtual workspace via the GUI client engine 304, potentially incorporating a portion of this local information 272, 806, 260 (i.e. the information stored or rendered locally on the user device 112) into the shared workspace information 504 shared with the other devices via the GUI rendering engine 302. Specific examples of incorporating local information into the shared workspace information 504 are described below, such as screen sharing (i.e. sharing a device's local workspace information 806 with the other devices) and file sharing (i.e. sharing with other devices a local data object stored in the memory 208 as data 260). However, it will be appreciated that any form of interaction between a device (e.g. user device 112) and the shared virtual workspace may result in local information being incorporated into the shared workspace information 504: for example, changes to a collaboratively edited document may be made by a local software application 272 running on the user device 112, and these changes may be propagated to the shared workspace information 504 via the GUI client engine 304 of the user device 112.

Figure 4:
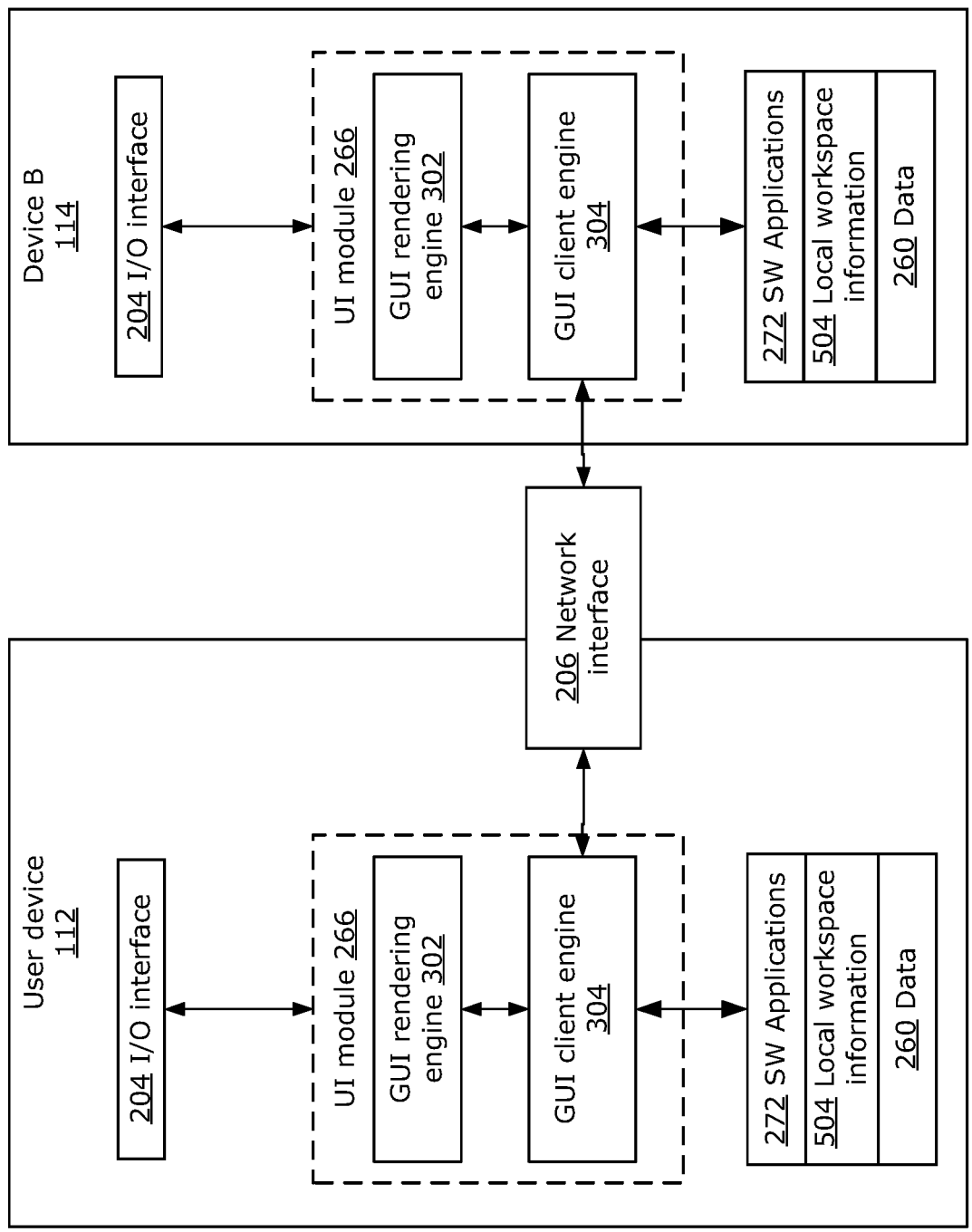
FIG. 4 is a block diagram illustrating data flows between components of the user device and local device B of FIG. 1 sharing the virtual workspace using the unified UI of FIG. 3.

FIG. 4 shows data flows between components of the user device 112 and local device B 114 sharing the virtual workspace using the unified UI of FIG. 3. In the illustrated example, each device (such as user device 112 and device B 114) includes the GUI rendering engine 302 and a respective GUI client engine 304 as part of the device's UI module 266 executed by the device's processor 202. Thus, the shared workspace information 504 is generated by the GUI rendering engine 302 of each device, which communicate with each other through the device's GUI client engine 304 to share the information used to generate the shared workspace information 504. Thus, the GUI client engine 304 of the user device 112 communicates with the GUI client engine 304 of device B 114 via the network interface 206, for example via a short-range wireless communication protocol such as UWB suitable for communication within the local environment. Similarly, in some embodiments the GUI client engine 304 of the user device 112 may communicate with the GUI client engine 304 of remote device F 132 via the network interface 206, for example via a wireless communication protocol such as WiFi suitable for communication with a network router configured to communicate across the Internet such that the user device 112 is able to participate in the network communication session 130.

Each device (e.g., 112 and 114) renders a GUI for the shared virtual workspace using its respective GUI rendering engine 302, which is displayed to the user using a display 242 or other output device 240 via the I/O interface 204. The I/O interface also enables the reception of user input via one or more input devices 220 for interacting with the GUI; user input received by the I/O interface 204 may be sent to the interpreter 264 (not shown) to be processed (e.g., gesture input received from a touchscreen 224 may be processed by the gesture recognition module 268) before being provided to the UI module 266 for interaction with the GUI.

Figure 5:
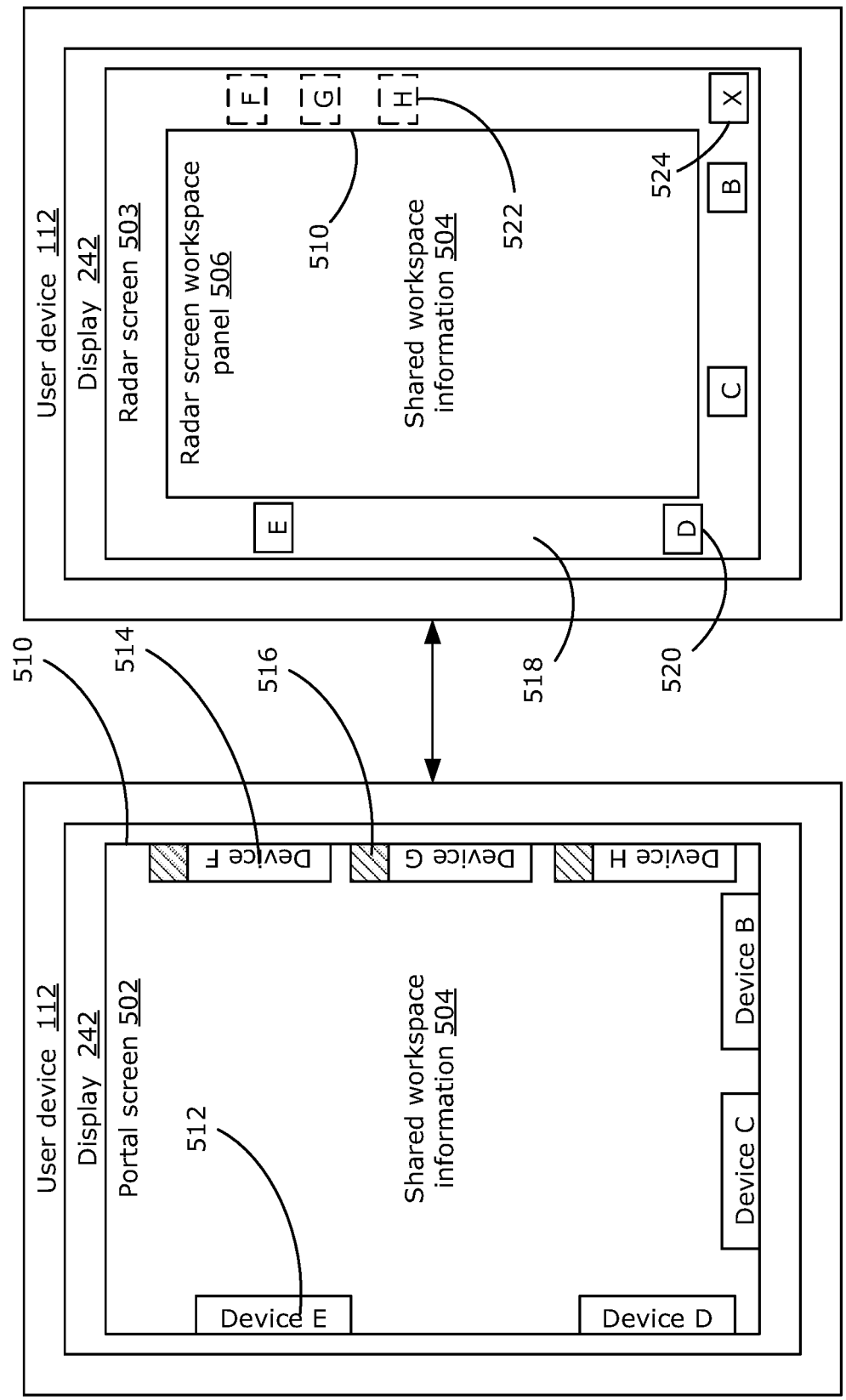
FIG. 5 is front views of a portal screen and a radar screen displayed on a display of the example user device of FIG. 2 in a portal mode and a radar mode respectively.

FIG. 5 shows two examples of GUI screens rendered on the display 242 of the user device 112 by the GUI rendering engine 302. On the left, a portal screen 502 is shown, which may be rendered on the display 242 when the user device 112 is operating in a portal mode. On the right, a radar screen 503 is shown, which may be rendered on the display 242 when the user device 112 is operating in a radar mode. Example methods for switching the user device 112 between the portal mode and the radar mode are described below with reference to FIGS. 12A-12B.

The portal screen 502 displayed during the portal mode may be a GUI screen used for passive collaboration with the other devices sharing the virtual workspace. The portal screen 502 maximizes the display region used for showing a workspace, such as the shared virtual workspace (containing shared workspace information 504, as illustrated) or a local workspace (e.g., a local desktop containing local workspace information 806), and only shows ambient graphical indicators of the other devices sharing the virtual workspace in the form of linked device GUI elements 512 displayed along a perimeter 510 of the portal screen 502. Each linked device GUI element 512 corresponds to either a local device (within the local environment 110) or a remote device (participating in the network communication session 130). Each linked device GUI element 512 for a local device is displayed at a respective position along the perimeter 510 of the portal screen 502 indicative of the direction of the respective local device relative to the user device 112, as determined by the device position recognition module 270 by processing the location information based on the sensor data (e.g., from the relative direction sensors 236 of the user device 112 and/or one or more local devices 114, 116, 118, 120). In the illustrated embodiment, the linked device GUI elements 512 for the remote devices are remote linked device GUI elements 514, which include a further remote status indicator 516 graphically indicating that the linked device is remote from the local environment 110. In some embodiments, all of the remote linked device GUI elements 514 may be clustered together in a region of the portal screen 502, such as near the center of the right edge of the portal screen 502 as shown in FIG. 5.

The radar screen 503 displayed during the radar mode may be a GUI screen used for more active or detailed collaboration with, or management of, the other devices sharing the virtual workspace. The radar screen 503 contains the workspace (e.g., the shared virtual workspace containing shared workspace information 504 or the local workspace containing local workspace information 806) within a radar screen workspace panel 506, which is surrounded by a border 518 within which are displayed radar screen linked device GUI elements 520 displayed along the perimeter 510 of the radar screen 503. In some embodiments, the radar screen linked device GUI elements 520 corresponding to remote devices may be displayed as radar screen remote linked device GUI elements 522, which may be graphically distinguished from the radar screen linked device GUI elements 520 corresponding to local devices (as illustrated in FIG. 5 by dashed lines around the radar screen remote linked device GUI elements 522). In some embodiments, the radar screen linked device GUI elements 520 may display more information relating to each respective device than the linked device GUI elements 512 of the portal screen 502, and may enable more complex interactions with each respective device to manage the relationship or status of the device in relation to the shared virtual workspace. The border 518 may also contain one or more additional GUI elements 524, such as interactive icons for managing specific aspects of the virtual workspace, such as shared data or the status of the user device 112 itself with respect to the virtual workspace.

In some embodiments, the linked device GUI elements 512 and radar screen linked device GUI elements 520 are interactive GUI elements, which may be interacted with using input devices 220 to perform various operations in relation to the virtual workspace, as described herein.

Figure 6A:
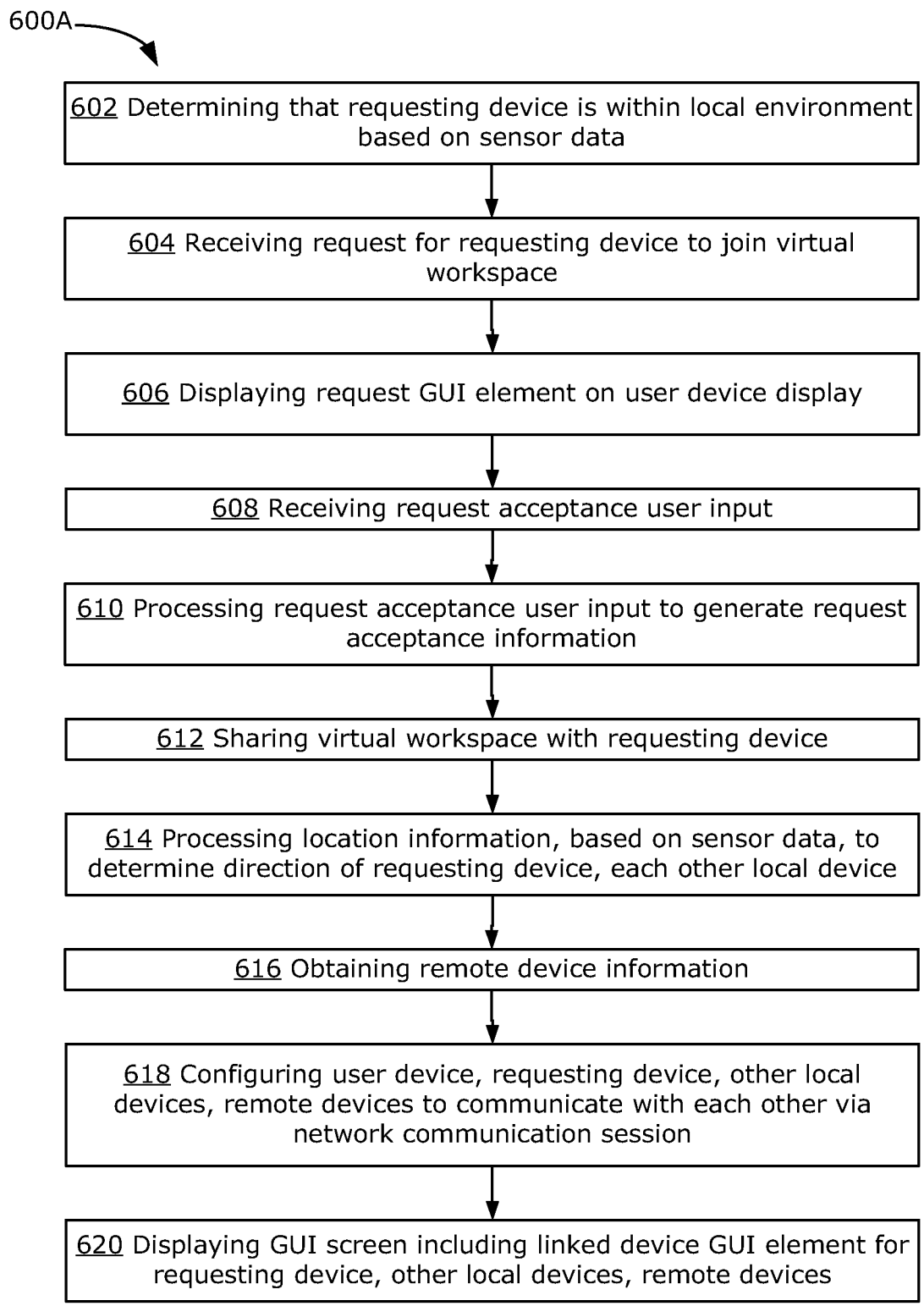
FIG. 6A is a flowchart illustrating a first example method for managing a virtual workspace that may be performed by the devices of FIG. 1.

FIG. 6A is a flowchart showing steps of a first example method 600A for managing the virtual workspace that may be performed by the devices of FIG. 1, such as the user device 112. Specifically, the method 600A describes a set of steps for sharing the virtual workspace with a new local device when it enters the local environment 110. The method 600A will be described with reference to the user device 112, but as with the other methods and operations described herein, may be equally applicable to any other local or remote device sharing the virtual workspace.

At 602, a new device, referred to as the requesting device, is determined to be within the local environment 110. For the purpose of this example, the requesting device is assumed to be device B 114, and the other local devices (user device 112, device C 116, device D 118, and device E 120) are assumed to already be sharing the virtual workspace.

The determination that the requesting device 114 is within the local environment 110 is made based on sensor data collected by the sensors 232 of one or more of the requesting device 114 and the other local devices 112, 116, 118, 120. For example, distance sensors 234 of the requesting device 114 and the user device 112 (such as the various light sensors, acoustic sensors with acoustic signal generators, electromagnetic signal transmitters and/or detectors, and/or physical contact sensors described above) could detect that the requesting device 114 is within a predetermined proximity to the user device 112, thus determining that the requesting device 114 is within the local environment 110. Alternatively, the user device 112 could define a geo-location of the local environment 110 with respect to a current location of the user device 112 and/or one or more other local devices, and the requesting device 114 could use a global positioning system (GPS) sensor to determine that the requesting device 114 is within the local environment 110 based on comparing the GPS sensor readings and the geo-location of the local environment 110 defined by the user device 112. The geo-location of the local environment 110 might be sent from the user device 112 to the requesting device 114 via the Internet or a short-distance P2P wireless protocol. In some embodiments, the geo-location of the local environment may be defined with respect to a device having a fixed location, such as a device installed in a conference room, or the server 140.

At 604, in response to determining that the requesting device 114 is within the local environment 110, the user device 112 receives a request for the requesting device 114 to join the virtual workspace. The request might be received from the requesting device 114, or it may be initiated from the user device 112 itself or another local device in response to determining that the requesting device 114 is within the local environment 110.

At 606, a request GUI element is displayed on the display 242 of the user device 112. The request GUI element is representative of the request: for example, in some embodiments the request GUI element is a popup window or dialogue box informing the user of the user device 112 of the nature of the request, e.g., identifying the requesting device 114 and asking whether the user wishes to share the virtual workspace with the requesting device 114. In some embodiments, the request GUI element may be a version of a linked device GUI element 512, displayed along the perimeter of the GUI screen of the user device 112 in a location corresponding to the relative direction of the requesting device 114, but with a graphical indicator that the indicating device 114 is requesting to join the virtual workspace (such as a distinctive color, a periodically shifting appearance such as flashing or pulsing, a distinct icon superimposed over the GUI element, etc.).

At 608, the user device 112 receives, for example, via an input device 220 of the user device 112, a request acceptance user input indicating acceptance of the request. For example, if the request GUI element is a window or dialogue box, it may include interactive buttons indicating acceptance or denial of the request (e.g., buttons labelled "OK" and "Cancel"). If the request GUI element is a linked device GUI element 512, the request acceptance user input may be pointing device input selecting the linked device GUI element 512 followed by pointing device input indicating acceptance of the request in response to a further prompt. It will be appreciated that any suitable GUI interaction may be used for steps 606 and 608.

At 610, the request acceptance user input is processed to generate request acceptance information. The request acceptance information indicates permission for the requesting device 114 to join the virtual workspace. In some embodiments, the request acceptance information may include information necessary to authorize the sharing of the virtual workspace with the requesting device 114, such as authentication information or account credentials necessary to enable communication of the GUI client engine 304 of the requesting device 114 with the GUI client engines 304 of the other devices sharing the virtual workspace as shown in FIG. 4.

At 612, in response to obtaining the request acceptance information at step 610, the virtual workspace is shared with the requesting device 114 such that the requesting device is included among the one or more local devices. The request acceptance information, or other information authorizing access to the virtual environment by authorizing communication between the GUI client engine 304 of the requesting device 114 with the GUI client engines 304 of the other devices, may be sent to each other device sharing the virtual workspace. Location information indicating the location of the requesting device 114 relative to each other local device 112, 116, 118, 120 may also be sent to each local device to enable each such device to display a linked device GUI element 512 for the requesting device 114 in the respective appropriate location along the perimeter 510 of the GUI screen of the respective device.

At 614, the location information for each local device, which is based on sensor data collected by one or more of the devices, is processed to determine, for each local device 112, 114, 116, 118, 120, a direction of the local device relative to the user device 112. This step 614 may be performed at each local device to determine the direction of each local device relative to the device processing the location information, so as to enable the local device processing the location information to render the UI (using its UI rendering engine 302) to display the linked device GUI elements 512 in their proper locations with respect to said local device.

At 616, remote device information is obtained. The remote device information identifies the one or more remote devices (e.g., 132, 134, 136) among which the virtual workspace is being shared. In some embodiments, the remote device information is received via the server 140 mediating the remote communication session 130. In some embodiments, the remote device information is received from each respective remote device using a P2P network communication protocol. In some embodiments, the remote device information may be received by a single local device participating in the remote communication session 130 and related to the other local devices, whereas in other embodiments the remote device information is received directly by all local devices.

At 618, the local devices, including the requesting device 114, are configured to communicate with the remote devices 132, 134, 136, and optionally with the other local devices 112, 116, 118, 120 via the network communication session 130. This configuration step 618 may include initiating network communications between the various devices using one or more predefined network protocols to enable communication between the GUI client engines 304 of each device via the network interfaces 206, as shown in FIG. 4. In some embodiments, communication among the local devices may occur via a short-range P2P protocol or a short-range protocol mediated by a single device such as server 140 (if the server 140 is present in the local environment 110) or one of the local devices; in some embodiments, communication among the local devices may occur via the network communication session 130.

At 620, a GUI screen is displayed on the display 242 of the user device 112 including, for each local device (including the requesting device 114, now added to the set of local devices at step 612), a linked device GUI element 512 corresponding to the local device and comprising a graphical indicator of the respective direction of the local device. Examples of such GUI screens include the portal screen 502 and radar screen 503 shown in FIG. 5, including linked device GUI elements 512 and radar screen linked device GUI elements 520 respectively for each local device. Other example GUI screens, which may be rendered in either portal mode or radar mode, are described below with reference to FIG. 8. In some embodiments, the GUI screen may also include remote linked device GUI elements 514 (or radar screen remote linked device GUI elements 522) for each remote device sharing the virtual workspace.

In some embodiments, a method similar to method 600A may be used to share the virtual workspace with a new remote device, such as device F 132. Instead of step 602, the request to join the virtual workspace may be initiated by the new remote device 132 sending a request to one of the local devices or remote devices over a network, such as the Internet. In an alternate version of step 612, the virtual workspace would be shared with the requesting device (i.e. new remote device 132) such that the requesting device is included among the one or more remote devices.

Figure 6B:
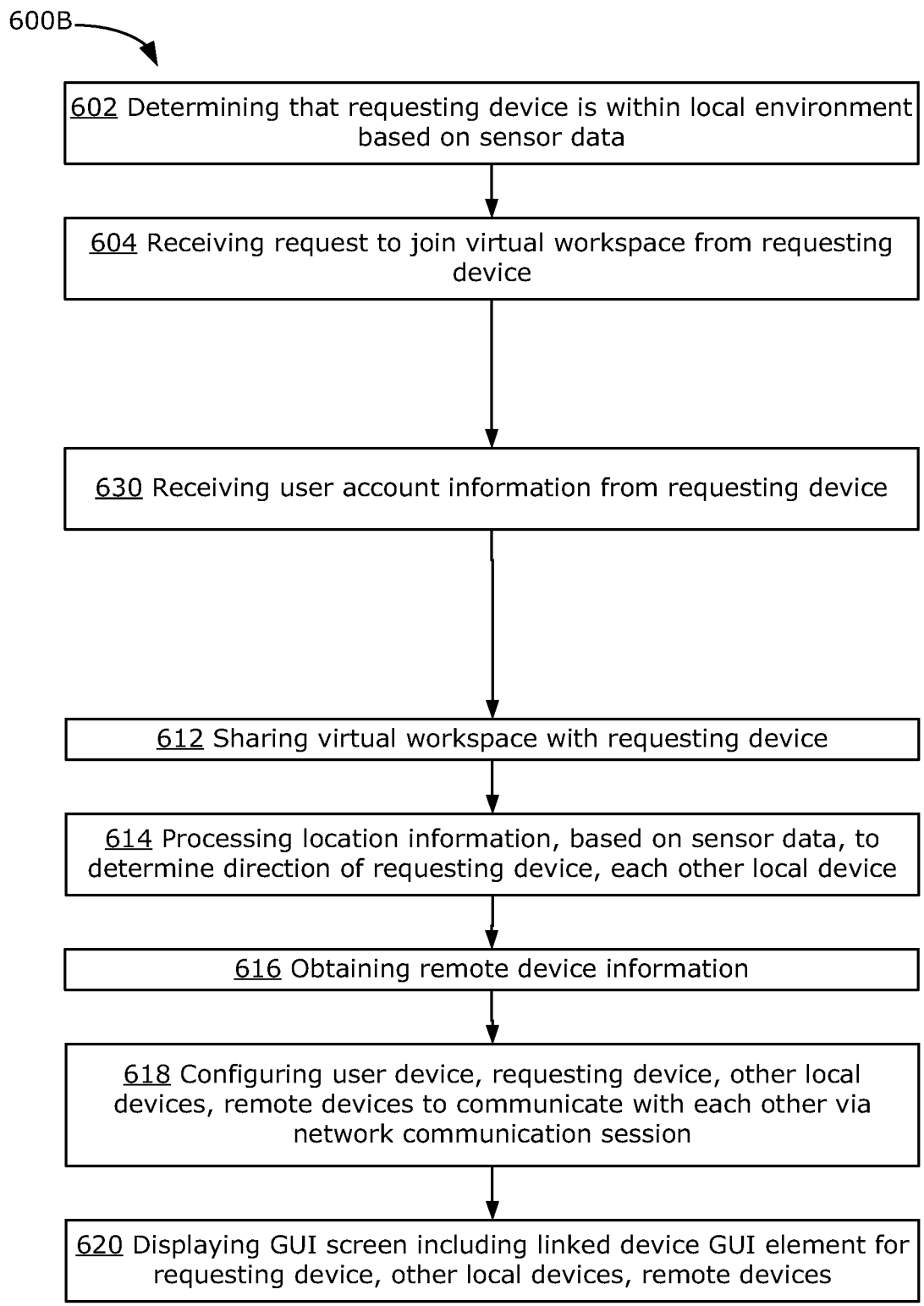
FIG. 6B is a flowchart illustrating a second example method for managing a virtual workspace that may be performed by the devices of FIG. 1.

FIG. 6B is a flowchart illustrating a second example method 600B for managing a virtual workspace that may be performed by the devices of FIG. 1, such as the user device 112. In this method 600B, the same steps are performed as in method 600A, except that steps 604, 606, and 608 (i.e. the steps governing receiving and approving the request for the virtual workspace to be shared with the requesting device 114) are replaced by step 630.

At 630, user account information is received from the requesting device 114. The user account information indicates a common user account shared by the requesting device 114 and one of the existing devices 112, 116, 118, 120, 132, 134, 136 sharing the virtual workspace. For example, the new device (requesting device 114) may be a mobile phone owned by a first user, and the first user may also own the user device 112, which is a laptop computer currently sharing the virtual workspace. At step 630, the first user's mobile phone (requesting device 114) may send to the user device 112 or another of the devices user account information associated with the first user, such as login credentials for the first user's user account, cryptographic authentication information signed using the first user's private encryption key, or any other user account information suitable for demonstrating that the requesting device 114 is associated with a user of the user device 112 currently authorized to access the shared virtual workspace.

In method 600B, the user account information may be used in place of, or as part of, the request acceptance information processed at step 612 to allow access by the requesting device 114 to the virtual workspace. In some embodiments, the request acceptance information may include not only the user account information but also additional information from the requesting device 114 or another device indicating that the user associated with the user account information has approved the request, via either the requesting device 114 or via another device owned by that user.

Figure 7:
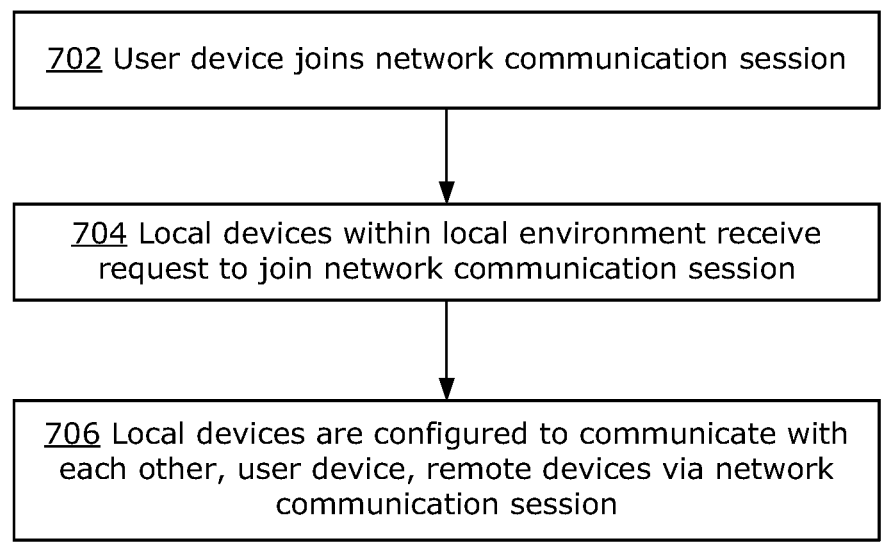
FIG. 7 is a flowchart illustrating an example method for joining the local devices to the network communication session of FIG. 1.

FIG. 7 shows steps of an example method 700 for joining the local devices to the network communication session 130. Method 700 may be considered an alternative to step 618 of methods 600A and 600B. Whereas methods 600A and 600B assume a scenario in which one or more of the local devices are already configured to communicate via the network communication session 130, method 700 assumes a scenario in which the local devices are sharing the virtual workspace, but the virtual workspace has not yet been shared with any remote devices. Method 700 is described with respect to the user device 112, but like the other methods and operations described herein, it applies equally to any local device sharing the virtual workspace.

At 702, the user device 112 joins the network communication session 130. This step 702 may be performed by the user device 112 in response to the user device 112 receiving a request from one of the remote devices or from the server 140 to allow one or more remote devices to share the virtual workspace. In response to the request, the user device 112 may join the network communication session 130, for example by initiating a network communication session with the one or more remote devices and/or the server 140 over the network interface 206 of the user device 112.

At 704, each other local device 114, 116, 118, 120 receives a request to join the network communication session 130. The requests may be sent by the user device 112, the server 140, or one of the remote devices. The requests may be processed automatically, or through user interaction, to determine whether the requests should be accepted or denied.

At 706, each local device which determines to accept the request joins the network communication session 130. The local device is configured to communicate with the remote devices via the network communication session 130, for example by initiating a network communication session with the one or more remote devices and/or the server 140 over the network interface 206 of the respective local device.

Thus, method 700 enables the local devices currently sharing the virtual workspace to join the network communication session 130 in response to one of the local devices joining the network communication session 130, thereby enabling the virtual workspace to be shared with all of the remote devices included in the network communication session 130. In some examples, the method 700 may allow the local devices and remote devices to bypass the need for their respective users to supply additional authentication credentials when being configured to communicate with the new devices sharing the shared virtual workspace: thus, if the user device 112 is authorized to join the network communication session 130, this may be sufficient to authorize all other local devices to join the network communication session 130, and also sufficient to authorize all remote devices to communicate with the local devices. In some examples, an alternative method may be used to allow a single remote device, currently participating in the network communication session 130, to be configured to communicate with the local devices and thereby automatically authorize all other remote devices to communicate with the local devices. In some examples, the communication among the local devices and the remote devices sharing the virtual workspace may be considered a hybrid communication session, in which some communications are performed via the network communication session 130 and other communications are performed using local communication techniques such as P2P communications using NFC.

Figure 8:
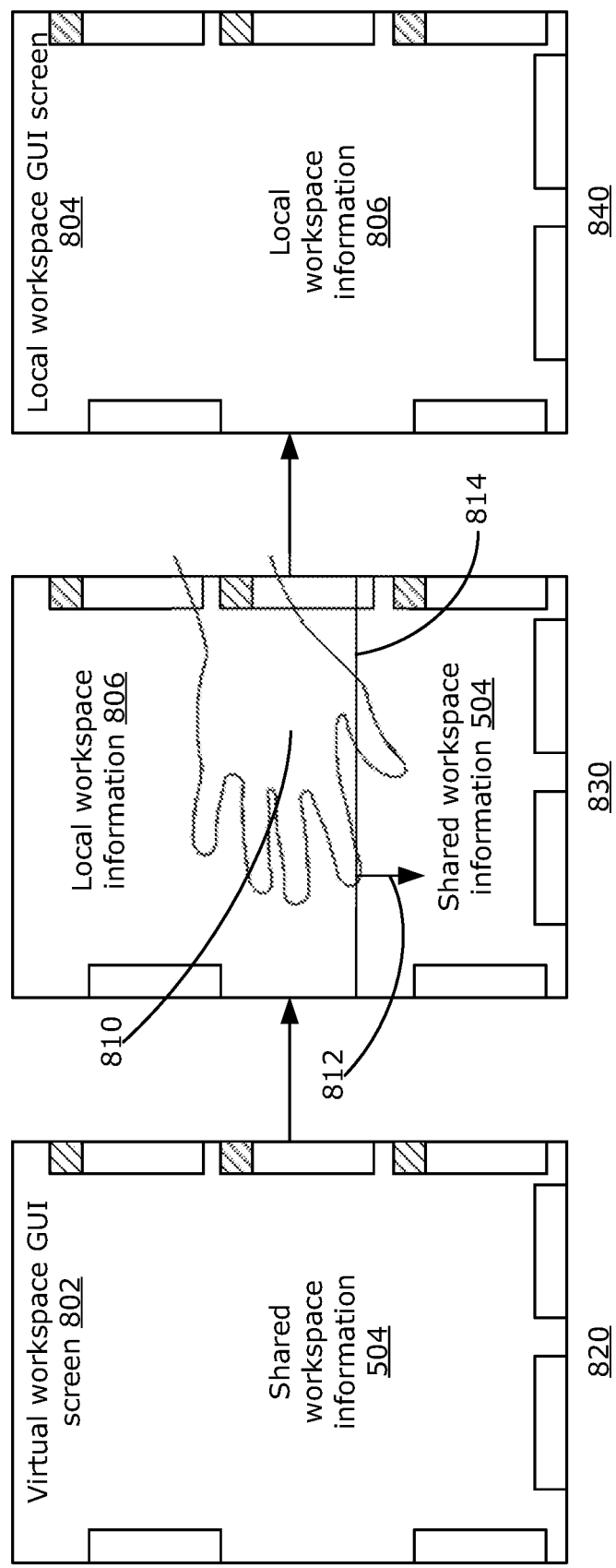
FIG. 8 is three front views of a GUI screen of the user device of FIG. 1 showing three steps of a method for switching between a virtual workspace GUI screen and a local workspace GUI screen.

FIG. 8 shows three steps 820, 830, 840 of a method for switching between a virtual workspace GUI screen 802 and a local workspace GUI screen 804 on the display 242 of the user device 112. The virtual workspace GUI screen 802 displays at least a portion of the shared workspace information 504, i.e. content being shared in the virtual workspace such as a shared desktop, another device's shared screen, a document being collaboratively edited, and so on as described above. The local workspace GUI screen 804 displays at least a portion of the local workspace information 806 not associated with the virtual workspace, such as a view of the local desktop of the user device 112. At step 820, the virtual workspace GUI screen 802 is displayed on the display 242. At step 830, a workspace switching user input is received by the user device 112 via the I/O interface 204: in this example, the workspace switching user input is a swiping gesture detected by the touchscreen 224, whereby the user's hand 810 swipes in direction 812 along the surface of the touchscreen 224 to cause the user device 112 to display, on the display 242, the local workspace GUI screen 804 at step 840.

It will be appreciated that any suitable user input detected by any suitable input device 220 may be used as the workspace switching user input in various embodiments. Although FIG. 8 shows the virtual workspace GUI screen 802 and local workspace GUI screen 804 in portal mode, it will be appreciated that the same method shown in FIG. 8 may be performed in radar mode.

Figure 9A:
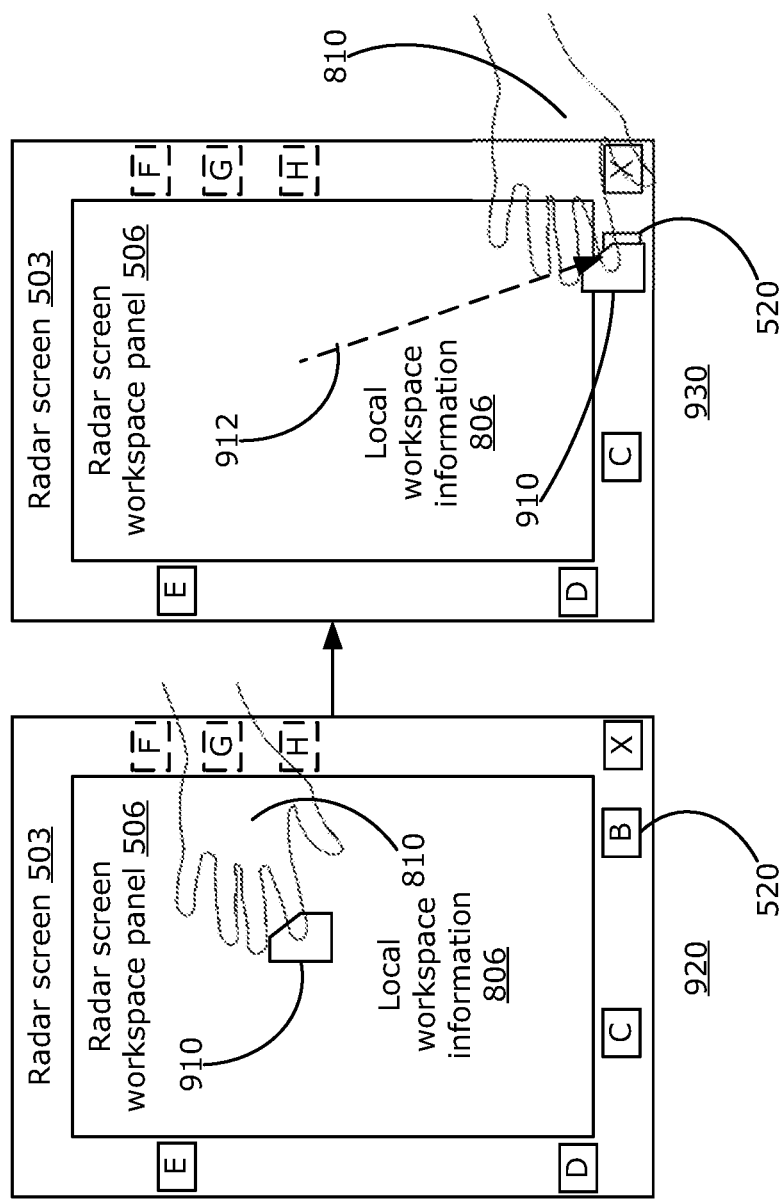
FIG. 9A is two front views of the radar screen of FIG. 5 showing two steps of a method for sharing a file with another device sharing the virtual workspace.

FIG. 9A shows two steps 920, 930 of a method for sharing a local data object (such as a file) with another device sharing the virtual workspace. In the first step 920, a radar screen 503 is displayed on the display 242 of the user device 112, including local workspace information 806 displayed within the radar screen workspace panel 506. The local workspace information 806 includes a data object icon 910 corresponding to a local data object not associated with the virtual workspace, such as a file icon or other GUI element associated with a file stored locally within the memory 208 as data 260. During the first step 920, the local data object is not associated with the virtual workspace, meaning that the local data object is not accessible by other devices sharing the virtual workspace. At step 920, the user's hand 810 initiates a dragging gesture by placing his or her finger over the data object icon 910 on the touchscreen 224.

At step 930, the user's hand 810 has completed the dragging gesture by moving the finger, still in contact with the touchscreen 224, to a location over one of the radar screen linked device GUI elements 520 (in the illustrated example, the radar screen linked device GUI element 520 corresponding to local device B 114). The user's hand 810 then lifts the finger away from the touchscreen 224 to finish the dragging gesture. This dragging gesture is interpreted by the gesture recognition module 268 as dragging user input intended to drag the data object icon 910 over the radar screen linked device GUI element 520 corresponding to local device B 114.

In response to receiving the dragging user input, the user device 112 shares the data object associated with the data object icon 910 (e.g., the file) with device B 114, for example by sending the file to device B 114. In some embodiments, sending the file to device B 114 may also comprise sub-steps such as sending a file transfer request to device B 114 using a network file-transfer protocol, acceptance of the file transfer request by a software process or user interaction of device B 114, and so on.

Figure 9B:
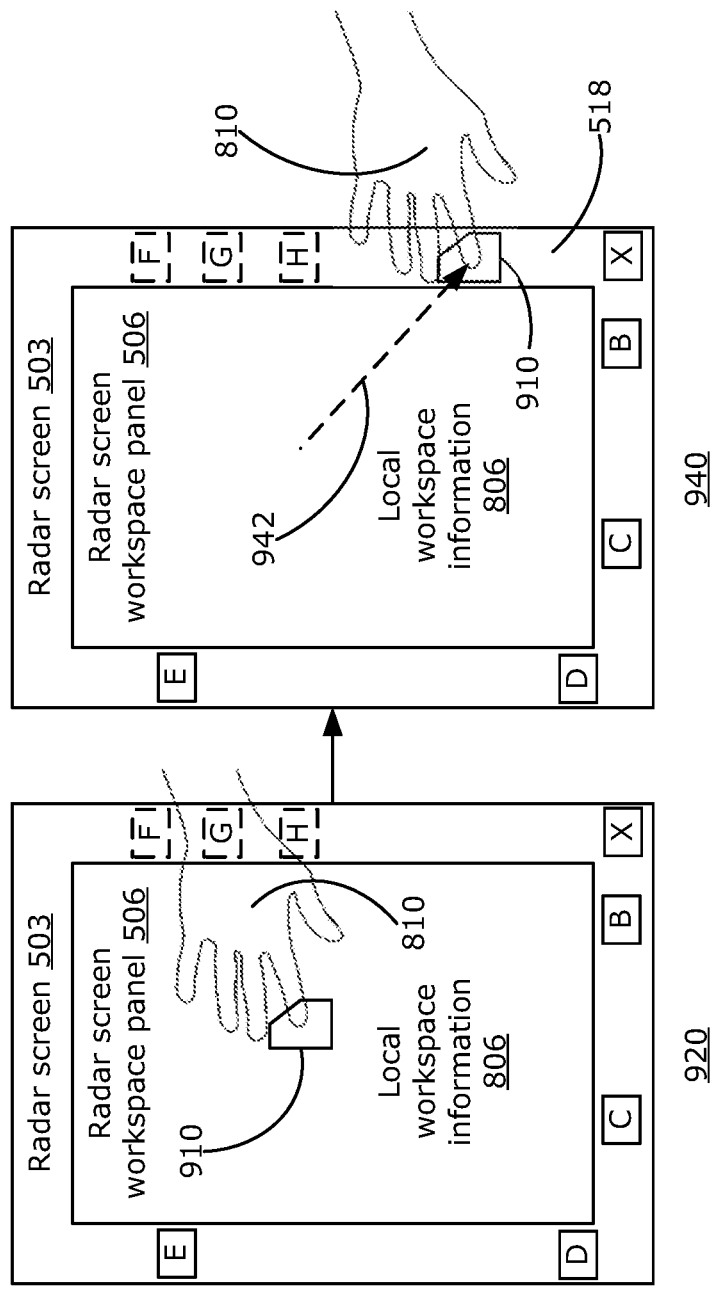
FIG. 9B is two front views of the radar screen of FIG. 5 showing two steps of a method for sharing a file with multiple devices sharing the virtual workspace.

FIG. 9B shows two steps 920, 940 of a method for sharing the local data object with multiple devices sharing the virtual workspace. The method shown in FIG. 9B differs from the method shown in FIG. 9A only insofar as the dragging gesture of the user's hand 810 is a perimeter dragging gesture that terminates, at step 940, at a location within the GUI screen within a predetermined distance of an edge of the GUI screen, i.e. within the border 518 of the radar screen 503, and not above a radar screen linked device GUI element 520 (as in step 930 of the method of FIG. 9A). In response to receiving the dragging user input shown in steps 920 and 940, the user device 112 sends the data object to some or all of the devices sharing the virtual workspace. In some embodiments, the data object is sent to all of the devices; in other embodiments, some devices may be included or excluded from the file-sharing step based on configuration settings of the user device 112, of the linked device(s), or of the virtual workspace as a whole.

Figure 10:
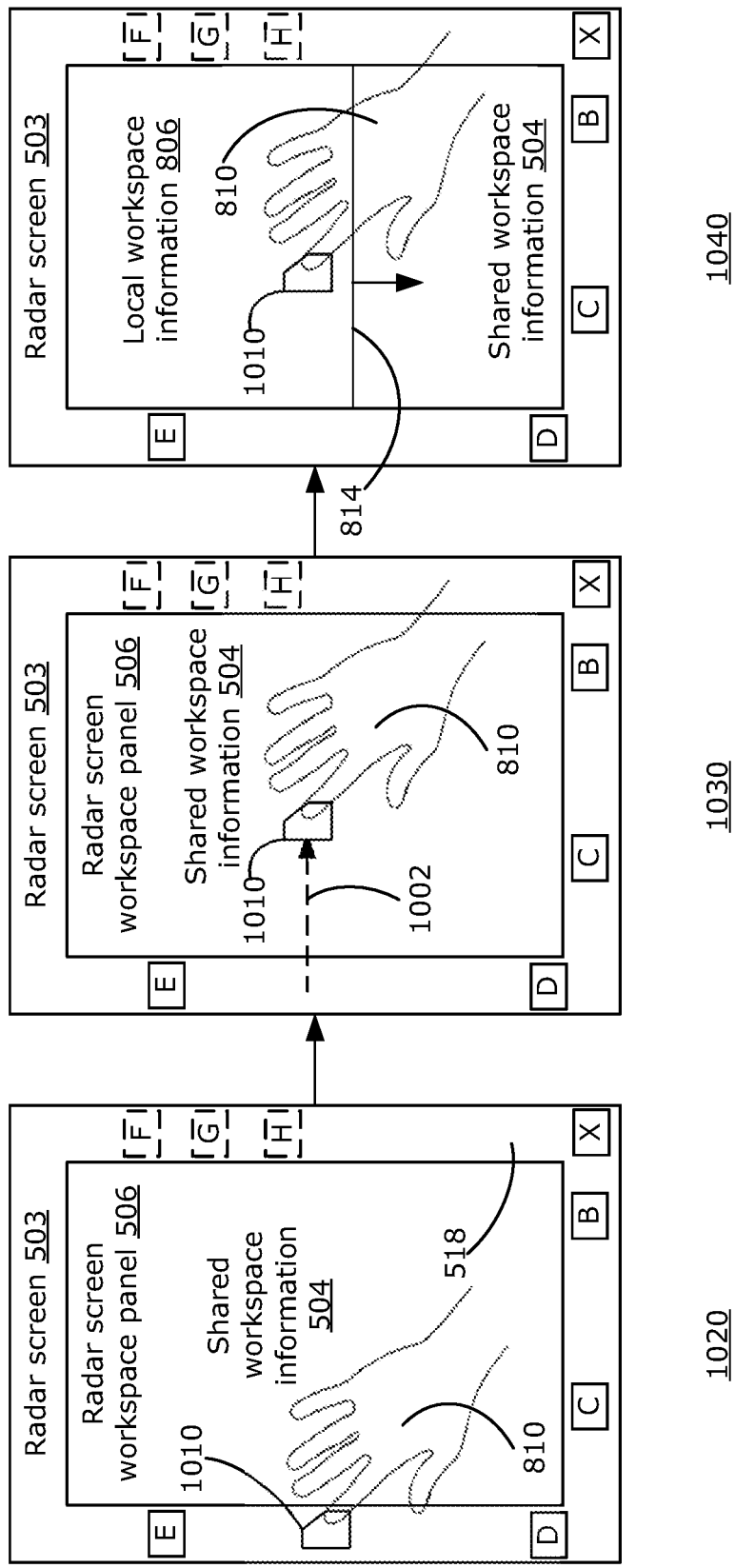
FIG. 10 is three front view of the radar screen of FIG. 5 showing three steps of a method for receiving and locally saving a file received from another device sharing the virtual workspace.

FIG. 10 shows three steps 1020, 1030, 1040 of a method for receiving and locally saving a file received from another device sharing the virtual workspace. The method shown in FIG. 10 represents an example of how the receiving device may respond to the final step 930 or 940 of the methods of FIGS. 9A or 9B respectively. For example, in response to step 930 of FIG. 9B, in which the file is sent to device B 114, device B 114 may respond by displaying, at step 1020, a received data object icon 1010 within the border 518 of the radar screen 503 displayed on the display 242 of device B 114. The user of device B 114 may then use his or her hand 810, between steps 1020 and 1030, to perform a dragging gesture similar to the dragging gestures of FIGS. 9A-9B. In the illustrated example, the dragging gesture begins over the received data object icon 1010 and terminates or pauses over the radar screen workspace panel 506 displaying the shared workspace information 504—however, it will be appreciated that in some examples device B 114 may be operating in a portal mode and the gesture may terminate within another portion of the portal screen 502, such as within the area displaying the shared workspace information 504. The dragging gesture is interpreted as dragging user input by the gesture recognition module 268 of device B 114.

In response to receiving the dragging user input, device B 114 displays, on its display 242, a local workspace GUI screen including the local workspace information 806 for the local workspace (e.g., local desktop view) of device B 114. This is shown in step 1040, wherein the shared workspace information 504 (e.g., a shared desktop view) slides downward in direction 814 to be displaced by the local workspace information 806 (e.g., a view of the local desktop of device B 114). Once the local workspace information 806 is displayed on the display 242 of device B 114, the user's hand 810 may continue dragging the received data object icon 1010 to position it within the local desktop display such that, when the dragging gesture terminates (e.g., by the finger lifting away from the touchscreen 224), the received data object is stored in the memory 208 of device B 114 in association with a location on the local desktop (i.e. as part of the local workspace information 806) corresponding to the location at which the dragging gesture terminates.

Thus, the methods shown in FIGS. 9A, 9B, and 10 may enable intuitive and efficient techniques for sharing a file or other data object with one or multiple devices sharing the virtual workspace.

Figure 11:
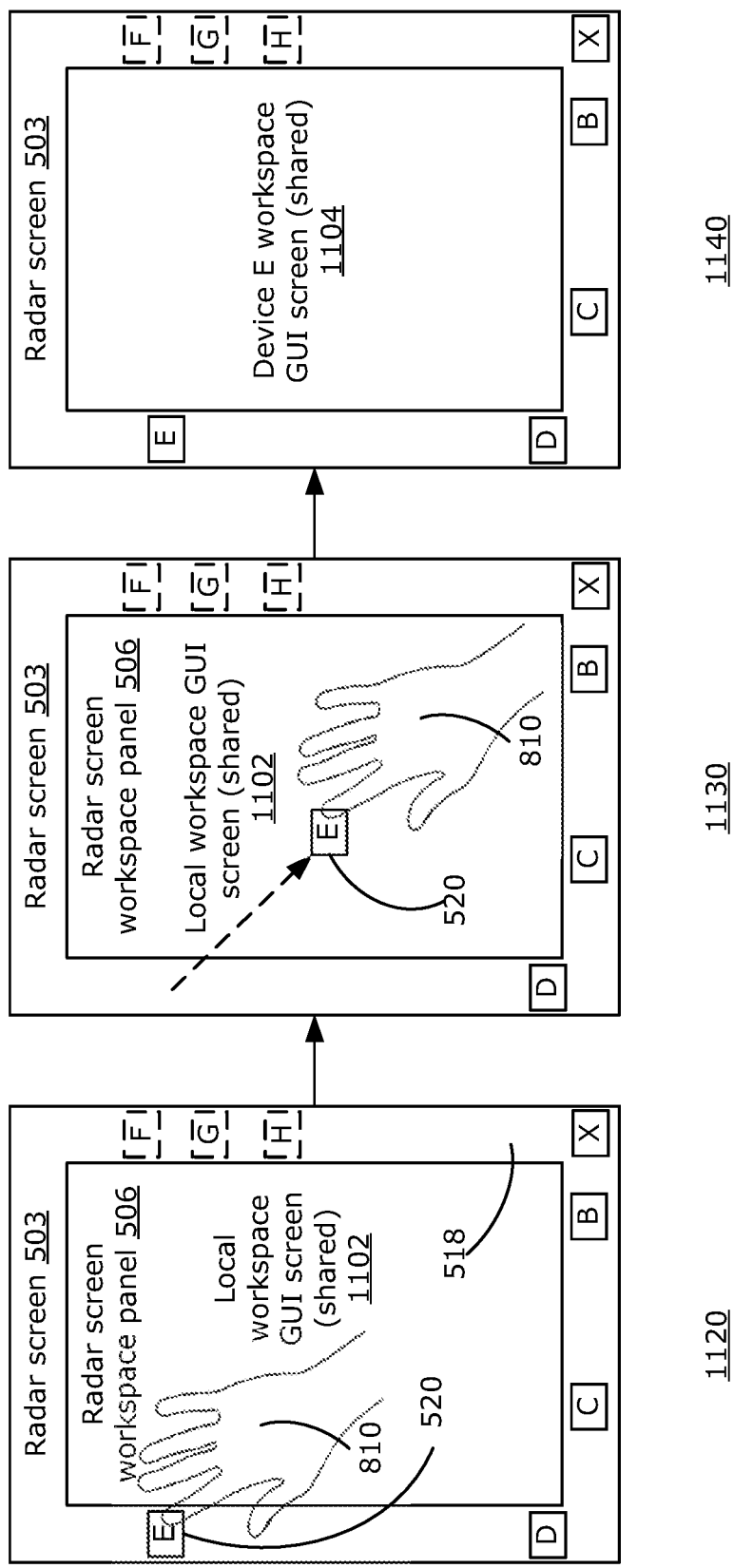
FIG. 11 is three front view of the radar screen of FIG. 5 showing three steps of a method for granting screen sharing control to another device sharing the virtual workspace.

FIG. 11 shows three steps 1120, 1130, 1140 of a method for granting screen sharing control to another device sharing the virtual workspace. The method is shown being performed by the user device 112. Prior to step 1120, the user device 1120 is sharing its screen with the other devices sharing the virtual workspace: this means that a local workspace GUI screen 1102 of the user device 112 is being shared with the other devices 114, . . . 136, thereby granting the other devices access to view the local workspace information 806 of the user device 112, such as the contents of the user device's 112 local desktop view, or the viewable contents of a window rendered on the local device 112 as part of a software application 272 being executed by the user device 112. Thus, when the user device 112 is sharing its screen, at least a portion of the local workspace information 806 of the user device 112 becomes accessible by the other devices as part of the shared workspace information 504.

At step 1120, a hand 810 of the user of the user device 112 initiates a dragging gesture beginning over the radar screen linked device GUI element 520 corresponding to device E 120. At step 1130, the dragging gesture terminates within the radar screen workspace panel 506. The dragging gesture is recognized by the gesture recognition module 268 as screen share transfer user input indicating a selection the radar screen linked device GUI element 520 associated with device E 120. In response to receiving the screen share transfer user input, screen sharing control is transferred from the user device 112 to device E 120. In some embodiments, this may result in a local workspace GUI screen of device E 120 being made accessible to the user device 112 and the other devices as part of the shared workspace information 504 (i.e., device E 120 immediately shares its screen); in other embodiments, the sharing of device E's 120 screen may be preceded by and contingent upon a sequence of prompts and user inputs from the user of device E 120 agreeing to share the screen of device E 120. After the screen of device E 120 is shared, at step 1140 the user device 112 may display on its display 242 a device E workspace GUI screen 1104 including local workspace information 806 of device E 120, e.g., a view of the local desktop of device E 120. The device E workspace GUI screen 1104 is also made accessible to the other devices sharing the virtual workspace.

Thus, the method of FIG. 11 may enable intuitive and efficient techniques for transferring screen sharing control between devices sharing the virtual workspace.

In some examples, the dragging user inputs used to initiate tasks such as file sharing and screen sharing as described above with reference to FIGS. 9A, 9B, 10, and 11, may alternatively be initiated using other forms of user input, such as a context menu or other prompt displayed in response to user input interacting with one of the linked device GUI elements. For example, a user may touch the touchscreen in the location of one of the linked device GUI elements 512, thereby causing a context menu to be displayed in which one of the options is "share file with this device"; activating this option will further cause the display of a prompt to select a file for sharing with the linked device, and so on.

Figure 12A:
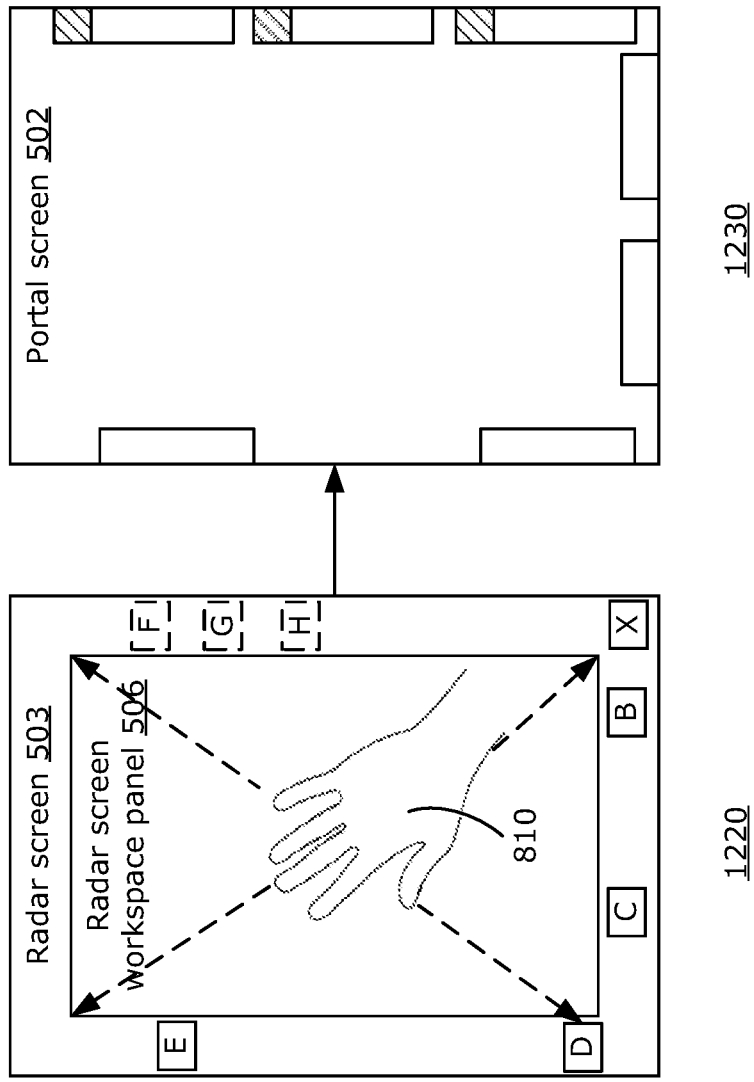
FIG. 12A is two front views of the user device display showing two steps of a method for switching from the radar mode to the portal mode of FIG. 5.

FIG. 12A shows two steps 1220, 1230 of a method for switching from the radar mode to the portal mode of the user device 112. At step 1220, the user device 112 is displaying the radar screen 503 when the user's hand 810 performs an outward-pinching gesture, e.g., two fingers of the user's hand 810 contact the touchscreen 224 at two initial locations, and then move away from each other (as indicated by the dashed arrows) while in contact with the touchscreen 224 until the gesture terminates with the fingers at two locations relatively farther from each other than the two initial locations. In response to recognizing the outward-pinching gesture, using the gesture recognition module 268, as a display mode switching user input, at step 1230 the user device 112 switches to portal mode and therefore displays the portal screen 502.

Figure 12B:
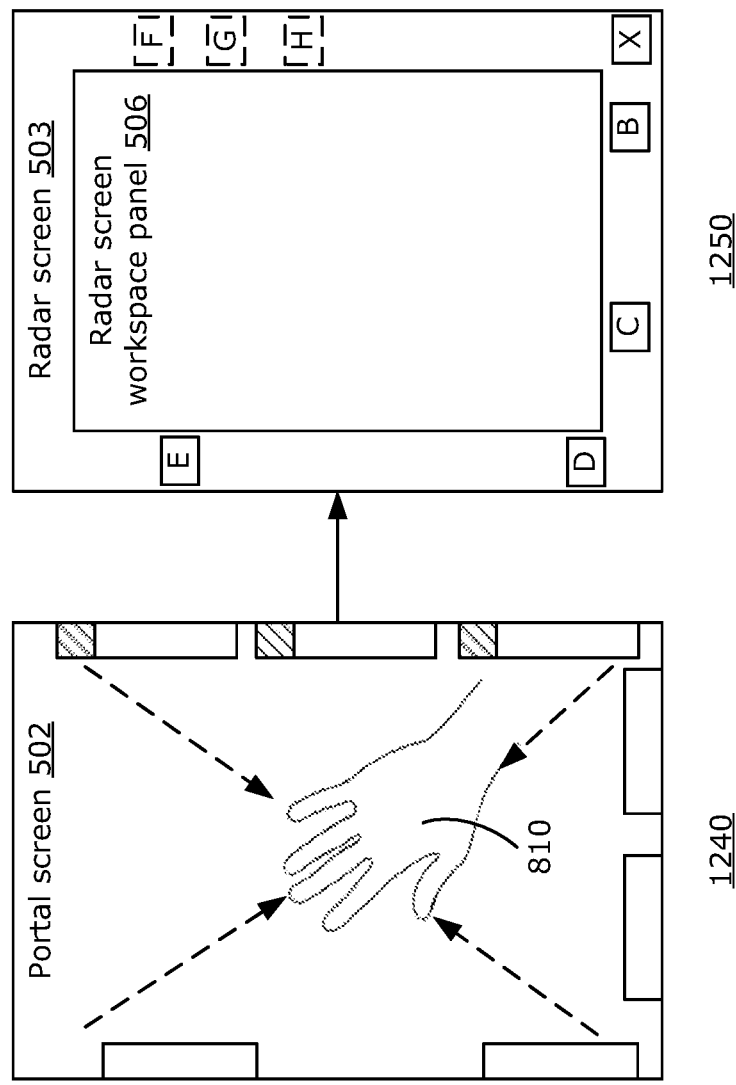
FIG. 12B is two front views of the user device display showing two steps of a method for switching from the portal mode to the radar mode of FIG. 5.

FIG. 12B shows two steps 1240, 1250 of a method for switching from the portal mode to the radar mode of the user device 112. The method of FIG. 12B is essentially the inverse of the method of FIG. 12A: at step 1240 the user device 112 is in portal mode displaying the portal screen 502 when it receives an inward-pinching gesture from the user's hand 810 (i.e. the fingers move closer together when in contact with the touchscreen 224 as shown by the dashed arrows). The user device 1250 recognizes the inward-pinching gesture, using the gesture recognition module 268, as a display mode switching user input, and in response, at step 1250, the user device 112 switches to radar mode and therefore displays the radar screen 503.

In some examples, the dragging or pinching user inputs used to initiate tasks such as switching between a local workspace display and a shared workspace display (as described above with reference to FIG. 8) or switching between portal mode and radar mode (as described above with reference to FIGS. 12A-12B) may alternatively be initiated using other forms of user input, such as via interaction with a dedicated GUI element designated for this purpose.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The ivention claimed is:

1. A method for managing a virtual workspace shared among a plurality of devices comprising a user device and one or more local devices such that each of the plurality of devices has access to shared workspace information associated with the virtual workspace, the method comprising:
   determining, for each local device, a direction of the local device relative to the user device based on location information based on sensor data collected by one or more of the plurality of devices; and
   displaying, on a display of the user device, a graphical user interface (GUI) screen including:
   for each local device, a linked device GUI element corresponding to the local device and comprising a graphical indicator displayed at a respective position along a perimeter of the GUI screen indicative of the respective direction of the local device;
   wherein, when the user device is operating in a portal mode, the GUI screen is a portal screen that further includes a workspace panel having a first display size; and
   wherein, when the user device is operating in a radar mode, the GUI screen is a radar screen that further includes a radar screen workspace panel having a second display size smaller than the first display size and having a border outside of the radar screen workspace display panel, and each linked device GUI element corresponding to each respective local device is displayed within the border;
   the user device being switchable between the portal mode and the radar mode in response to a display mode switching user input.

2. The method of claim 1, wherein:
   each linked device GUI element comprises an interactive GUI element configured to receive user input via a pointing device of the user device.

3. The method of claim 1, further comprising, prior to displaying the GUI screen:
   receiving, at the user device, a request for a requesting device to join the virtual workspace;
   obtaining request acceptance information indicating permission for the requesting device to join the virtual workspace; and
   in response to obtaining the request acceptance information, sharing the virtual workspace with the requesting device such that the requesting device is included among the plurality of devices.

4. The method of claim 3, wherein obtaining the request acceptance information comprises:
   displaying, on the display of the user device, a request GUI element representative of the request;
   receiving, via an input device of the user device, a request acceptance user input indicating acceptance of the request; and
   processing the request acceptance user input to generate the request acceptance information.

5. The method of claim 3, wherein obtaining the request acceptance information comprises:
   receiving, from the requesting device, user account information indicating a common user account shared by the requesting device and one or more of the plurality of devices.

6. The method of claim 3, wherein:
   the requesting device is a local device of the one or more local devices; and
   the request is received in response to the requesting device being determined, based on the sensor data, to be within a local environment of the user device.

7. The method of claim 1, wherein:
   the GUI screen comprises a virtual workspace GUI screen further including at least a portion of the shared workspace information.

8. The method of claim 7, further comprising:
   receiving a workspace switching user input via an input device of the user device; and
   displaying, on the display of the user device, a local workspace GUI screen, also including a linked device GUI element for each of the plurality of devices other than the user device, the local workspace GUI screen including local workspace information not associated with the virtual workspace.

9. The method of claim 1, further comprising:
receiving, via the pointing device, a dragging user input indicating a dragging gesture performed with respect to a data object icon corresponding to a local data object not associated with the virtual workspace, the dragging gesture terminating at a location within the GUI screen corresponding to a first linked device GUI element of the linked device GUI elements, the first linked device GUI element corresponding to a first device of the plurality of devices other than the user device; and
in response to receiving the dragging user input, sending the local data object to a first device.

10. The method of claim 9, further comprising:
receiving, at the first device, the local data object of the user device;
displaying, on a display of the first device, a first device GUI screen including a received data object icon;
receiving, via a pointing device of the first device, a first device dragging user input indicating a dragging gesture performed with respect to the received data object icon;
in response to receiving the first device dragging user input, displaying, on the display of the first device, a first device local workspace GUI screen including first device local workspace information not associated with the virtual workspace; and
saving the received local data object to a memory of the first device in association with the first device local workspace information.

11. The method of claim 1, further comprising:
receiving, via the pointing device, a dragging user input indicating a perimeter dragging gesture performed with respect to a data object icon corresponding to a local data object not associated with the virtual workspace, the perimeter dragging gesture terminating at a location within the GUI screen within a predetermined distance of an edge of the GUI screen; and
in response to receiving the perimeter dragging user input, sending the local data object to the plurality of devices other than the user device.

12. The method of claim 1, further comprising:
activating a shared screen mode of the user device such that a local workspace GUI screen of the user device, including local workspace information of the user device not associated with the virtual workspace, is accessible by the plurality of devices as part of the shared workspace information;
receiving, via an input device of the user device, a screen share transfer user input indicating a selection of one of the linked device GUI elements associated with a first device of the plurality of devices other than the user device; and
in response to receiving the screen share transfer user input, displaying, on the display of the user device, a first device workspace GUI screen including local workspace information of the first device.

13. The method of claim 12, wherein:
the input device comprises the pointing device;
the GUI screen comprises a virtual workspace GUI screen further including at least a portion of the shared workspace information; and
the screen share transfer user input comprises a dragging gesture:
beginning at a location, within the GUI screen, of a first linked device GUI element of the plurality of linked device GUI elements; and
ending at a location, within the GUI screen, displaying the portion of the shared workspace information.

14. The method of claim 1, wherein:
the input device comprises a touchscreen;
the display mode switching user input comprises:
to switch from portal mode to radar mode, an inward pinching gesture; and
to switch from radar mode to portal mode, an outward pinching gesture.

15. The method of claim 1, further comprising:
obtaining remote device information identifying one or more remote devices, the virtual workspace being further shared among the one or more remote devices;
wherein the GUI screen further includes, for each remote device of the one or more remote devices, a linked device GUI element corresponding to the remote device and comprising a graphical indicator of the remote device.

16. The method of claim 15, wherein:
the one or more remote devices are configured to communicate with each other via a network communication session; and
sharing the virtual workspace among the one or more remote devices and the plurality of devices further comprises configuring the plurality of devices to communicate with each other and the one or more remote devices via the network communication session.

17. The method of claim 1, further comprising:
identifying the one or more local devices via short-range sensor data.

18. The method of claim 1, further comprising:
receiving, via an input device of the user device, the display mode switching user input; and
in response to receiving the display mode switching user input, switching the user device between the portal mode and the radar mode.

19. A user device for managing a virtual workspace shared among a plurality of devices comprising the user device and one or more local devices such that each of the plurality of devices has access to shared workspace information associated with the virtual workspace, the user device comprising:
a processor device;
a display; and
a memory storing machine-executable instructions which, when executed by the processor device, cause the user device to:
determine, for each local device, a direction of the local device relative to the user device based on location information based on sensor data collected by one or more of the plurality of devices; and
display, on the display, a graphical user interface (GUI) screen including:
for each local device, a linked device GUI element corresponding to the local device and comprising a graphical indicator displayed at a respective position along a perimeter of the GUI screen indicative of the respective direction of the local device;
wherein, when the user device is operating in a portal mode, the GUI screen is a portal screen that further includes a workspace panel having a first display size; and
wherein, when the user device is operating in a radar mode, the GUI screen is a radar screen that further includes a radar screen workspace panel having a second display size smaller than the first display size and having a border outside of the radar screen workspace display panel, and each linked device GUI element corresponding to each respective local device is displayed within the border;

the user device being switchable between the portal mode and the radar mode in response to a display mode switching user input.

20. A non-transitory processor-readable medium having machine-executable instructions stored thereon which, when executed by a processor of a user device, cause the user device to manage a virtual workspace shared among a plurality of devices comprising the user device and one or more local devices such that each of the plurality of devices has access to shared workspace information associated with the virtual workspace, by:

determine, for each local device, a direction of the local device relative to the user device based on location information based on sensor data collected by one or more of the plurality of devices; and displaying, on a display of the user device, a graphical user interface (GUI) screen including:
for each local device, a linked device GUI element corresponding to the local device and comprising a graphical indicator displayed at a respective position along a perimeter of the GUI screen indicative of the respective direction of the local device;
wherein, when the user device is operating in a portal mode, the GUI screen is a portal screen that further includes a workspace panel having a first display size; and
wherein, when the user device is operating in a radar mode, the GUI screen is a radar screen that further includes a radar screen workspace panel having a second display size smaller than the first display size and having a border outside of the radar screen workspace display panel, and each linked device GUI element corresponding to each respective local device is displayed within the border;

the user device being switchable between the portal mode and the radar mode in response to a display mode switching user input.

* * * * *